(12) United States Patent
Setlak et al.

(10) Patent No.: US 7,214,953 B2
(45) Date of Patent: *May 8, 2007

(54) MULTI-BIOMETRIC FINGER SENSOR INCLUDING OPTICAL DISPERSION SENSING PIXELS AND ASSOCIATED METHODS

(75) Inventors: Dale R. Setlak, Melbourne, FL (US); Richard J. Jones, Indialantic, FL (US); Gordon S. Franza, Rockledge, FL (US)

(73) Assignee: Authentec, Inc., Melbourne, FL (US)

( * ) Notice: Subject to any disclaimer, the term of this patent is extended or adjusted under 35 U.S.C. 154(b) by 246 days.

This patent is subject to a terminal disclaimer.

(21) Appl. No.: 10/935,705

(22) Filed: Sep. 3, 2004

(65) Prior Publication Data

US 2005/0063573 A1    Mar. 24, 2005

Related U.S. Application Data

(60) Provisional application No. 60/500,475, filed on Sep. 5, 2003, provisional application No. 60/536,305, filed on Jan. 14, 2004.

(51) Int. Cl.
*G06K 11/00* (2006.01)
*G06K 9/00* (2006.01)

(52) U.S. Cl. .................. 250/556; 356/71; 382/124

(58) Field of Classification Search ............ 250/556, 250/566; 382/115, 124, 125; 356/71
See application file for complete search history.

(56) References Cited

U.S. PATENT DOCUMENTS

| | | | |
|---|---|---|---|
| 4,394,773 A | 7/1983 | Ruell | 382/4 |
| 5,067,162 A | 11/1991 | Driscoll, Jr. et al. | 382/5 |
| 5,325,442 A | 6/1994 | Knapp | 382/4 |
| 5,351,303 A | 9/1994 | Willmore | 382/2 |
| 5,689,576 A | 11/1997 | Schneider et al. | 382/124 |
| 5,737,439 A * | 4/1998 | Lapsley et al. | 382/115 |
| 5,909,501 A | 6/1999 | Thebaud | 382/124 |
| 5,940,526 A | 8/1999 | Setlak et al. | 382/124 |
| 5,953,441 A | 9/1999 | Setlak | 382/124 |
| 6,118,890 A | 9/2000 | Senior | 382/125 |
| 6,134,340 A | 10/2000 | Hsu et al. | 382/124 |

(Continued)

FOREIGN PATENT DOCUMENTS

DE        10128717        12/2002

(Continued)

OTHER PUBLICATIONS

"Guide to Biometrics", Ruud M. Bolle, 2004, Springer, New York, USA, XP002347674, p. 94-96.

(Continued)

*Primary Examiner*—Stephone B. Allen
(74) *Attorney, Agent, or Firm*—Allen, Dyer, Doppelt, Milbrath & Gilchrist, P.A.

(57) ABSTRACT

A multi-biometric finger sensor may include at least one optical dispersion sensing pixel on an integrated circuit substrate for sensing dispersed light from the user's finger, and at least one other finger biometric characteristic sensor on the integrated circuit substrate for sensing a finger biometric characteristic different than the dispersed light from the user's finger. The sensor may also include a processor connected to the at least one optical dispersion sensing pixel and the at least one other finger biometric characteristic sensor.

25 Claims, 19 Drawing Sheets

U.S. PATENT DOCUMENTS

| | | | |
|---|---|---|---|
| 6,241,288 B1 | 6/2001 | Bergenek et al. | 283/67 |
| 6,289,114 B1 | 9/2001 | Mainguet | 382/124 |
| 6,327,376 B1* | 12/2001 | Harkin | 382/124 |
| 6,483,929 B1 | 11/2002 | Murakami et al. | 382/115 |
| 6,546,122 B1 | 4/2003 | Russo | 382/125 |
| 6,560,352 B2 | 5/2003 | Rowe et al. | 382/115 |
| 2002/0067845 A1 | 6/2002 | Griffis | 382/107 |
| 2002/0076089 A1 | 6/2002 | Muramatsu et al. | 382/124 |
| 2002/0138768 A1 | 9/2002 | Murakami et al. | 713/202 |
| 2003/0123714 A1 | 7/2003 | O'Gorman et al. | 382/124 |
| 2003/0126448 A1 | 7/2003 | Russo | 713/186 |
| 2003/0169910 A1 | 9/2003 | Reisman et al. | 382/124 |
| 2005/0069181 A1* | 3/2005 | Setlak et al. | 382/124 |

FOREIGN PATENT DOCUMENTS

| | | |
|---|---|---|
| WO | WO03/056502 | 7/2003 |

OTHER PUBLICATIONS

"Automatic Fingerprint Recognition Systems", Ratha et al., 2004, Springer, New York, USA, XP002347781, p. 27-53.

"Handbook of Fingerprint Recognition", Maltoni et al., Jun. 2003, Springer, New York, USA, XP0023498094, p. 59-65.

"Imaging Antenna Arrays", Rutledge et al., IEEE Transactions on Antennas and Propagation USA, vol. AP-30, No. 4, Jul. 1982, pp. 535-540, XP008039687, ISSN: 0018-926X.

"Antenna-Coupled Polycrystalline Silicon Air-Bridge Thermal Detector for Mid-Infrared Radiation", Chong et al., Applied Physics Letters AIP USA, vol. 71, No. 12, Sep. 22, 1997, pp. 1607-1609, XP008039674, ISSN: 003-6951.

"Zugangskontrolle Bei Biometrischen Zugangssystemen", Stetter et al., Siemens Technik Report, vol. 2, No. 3, Apr. 1999, pp. 9-11, XP007001785.

"Nichtinvasive Bestimmung Personenspezifischer Werte", Abraham-Fuchs et al., Siemens Technik Report, vol. 3, No. 6, Jan. 2000, pp. 10-11, XP007001985.

Bazen et al., A Correlation-Based Fingerprint Verification System, Proceedings of Workshop on Circuits Systems and Signal Processing, pp. 205-213, 2000.

Kovacs-Vanja, A Fingerprint Verification System Based on Triangular Matching and Dynamic Time Warping, IEEE Transactions on Pattern Analysis and Machine Intelligence, vol. 22, No. 11, Nov. 2000, pp. 1266-1276.

Coetzee et al., Fingerprint Recognition in Low Quality Images, Pattern Recognition, vol. 26, No. 10, pp. 1441-1460, 1993.

Halici et al., Fingerprint Classification through Self-Organizing Feature Maps Modified to Treat Uncertainties, Proceedings of the IEEE, vol. 84, No. 10, pp. 1497-1512, Oct. 1996.

Cappelli et al., Fingerprint Classification by Directional Image Partitioning, IEEE Transactions on Pattern Analysis and Machine Intelligence, vol. 21, No. 5, pp. 402-421, May 1999.

Almansa et al., Fingerprint Enhancement by Shape Adaptation of Scale-Shape Operators with Automatic Scale Selection, IEEE Transactions on Image Processing, vol. 9. No. 12, pp. 2027-2042, Dec. 2000.

Hong et al., Fingerprint Image Enhancement: Algorithm and Performance Evaluation, IEEE Transactions on Pattern Analysis, vol. 20, No. 8, pp. 777-789, Aug. 1998.

O'Gorman et al., An Approach to Fingerprint Filter Design, Pattern Recognition, vol. 22, No. 1, pp. 29-38, 1989.

Ratha et al., Image Mosiacing for Rolled Fingerprint Construction, 14th International Conference on Pattern Recognition-vol. 2, Aug. 16-20, 1998, Brisbane Australia.

Yau et al., On Fingerprint Template Synthesis, Proceedings of Sixth International Conference on Control, Automation, Robotics and Vision (ICARCV 2000), Singapore, Dec. 5-8, 2000.

Brown, A Survey of Image Registration Techniques, Department of Computer Science, Columbia University, ACM Computing Surveys, vol. 24, No. 4, Dec. 1992.

Jain et al., Fingerprint Mosaicking, Proc. of IEEE International Conference on Acoustics, Speech, and Signal Processing (ICASSP), Orlando, Florida, May 13-17, 2002.

Maltoni et al., Handbook of Fingerprint Recognition, Section 2.5, Touch Versus Sweep, pp. 65-69, Springer-Verlag, New York, 2003.

* cited by examiner

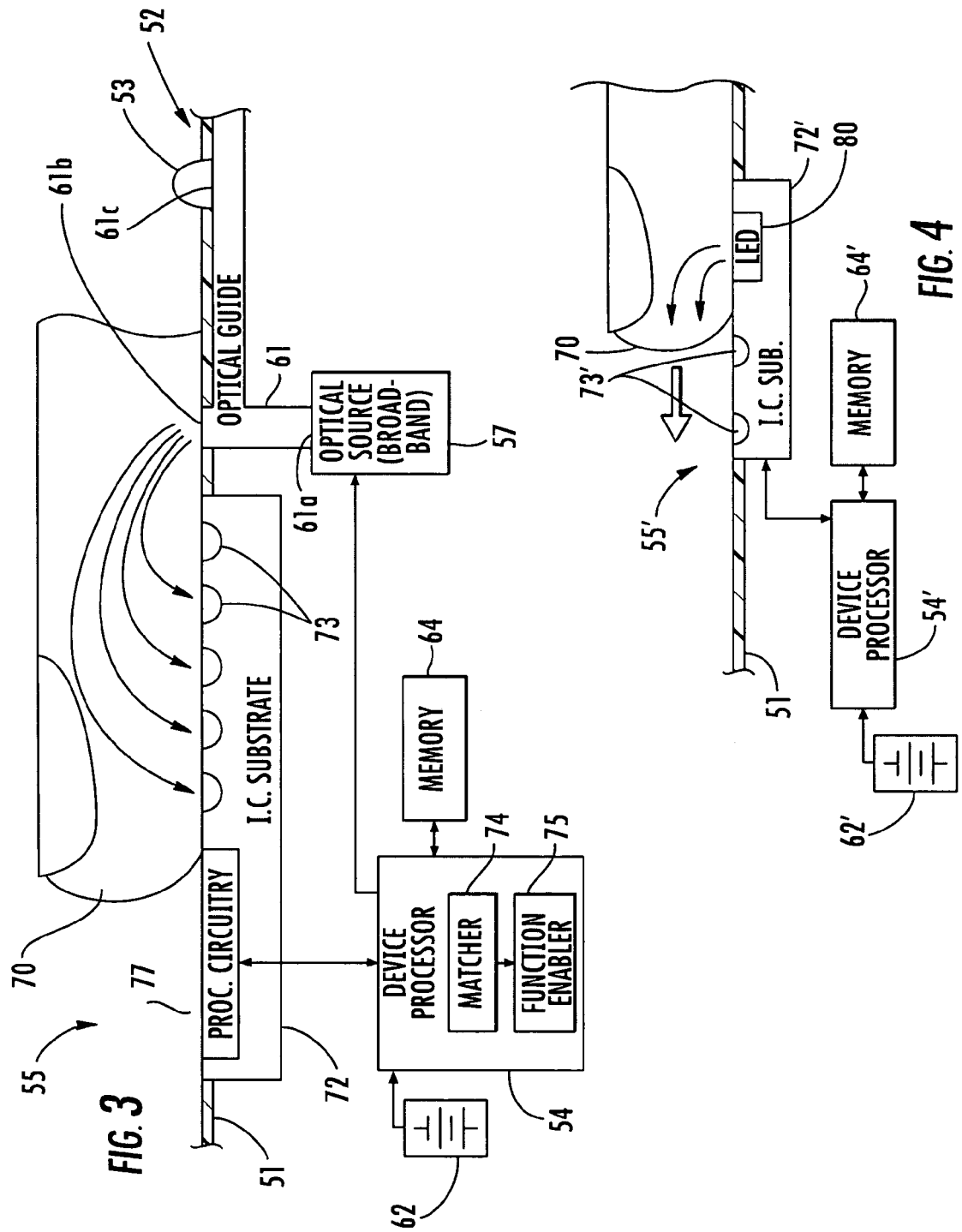

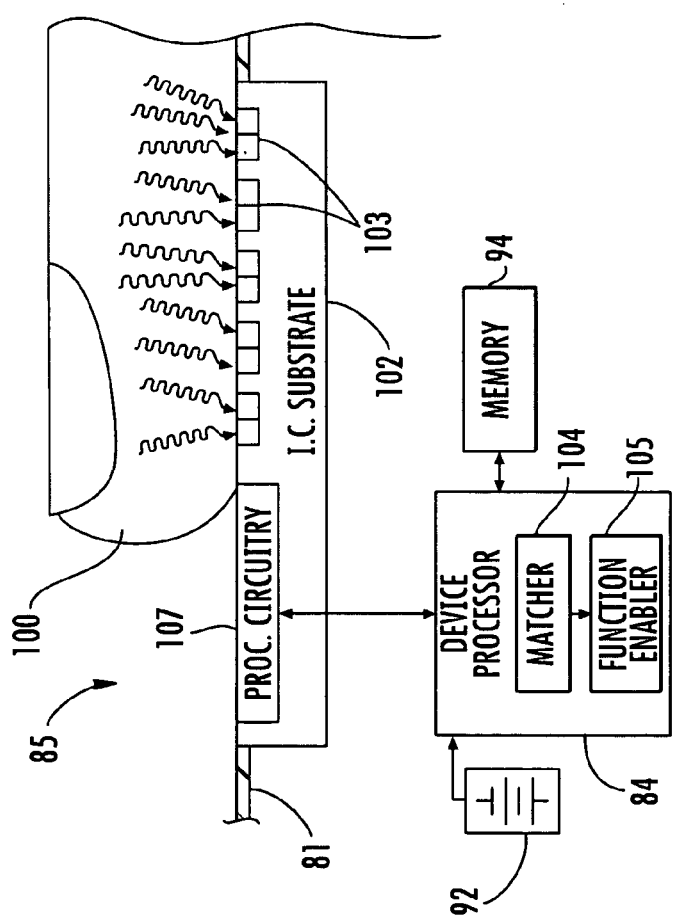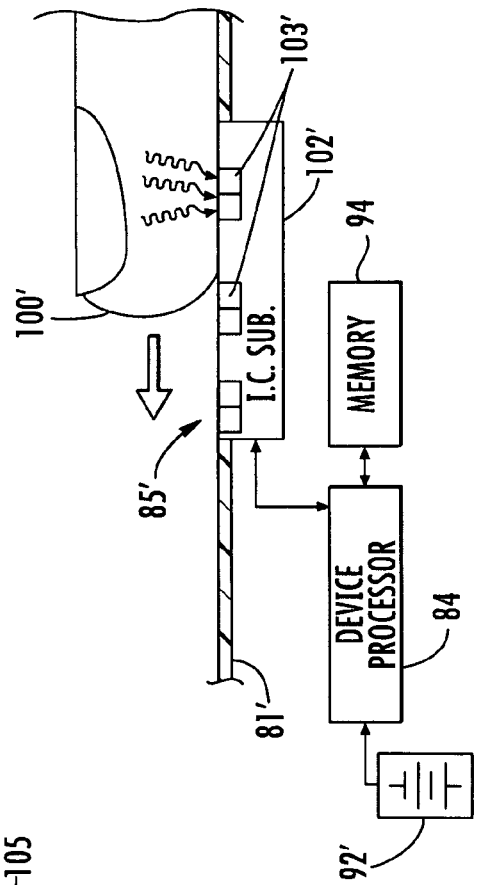

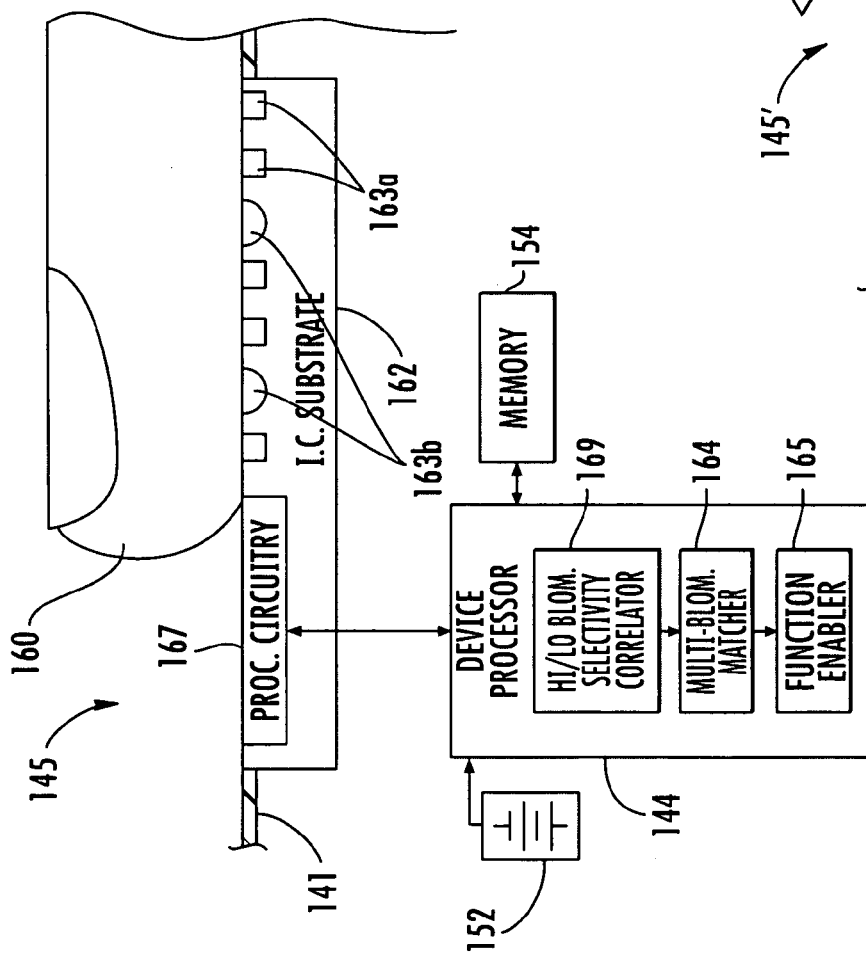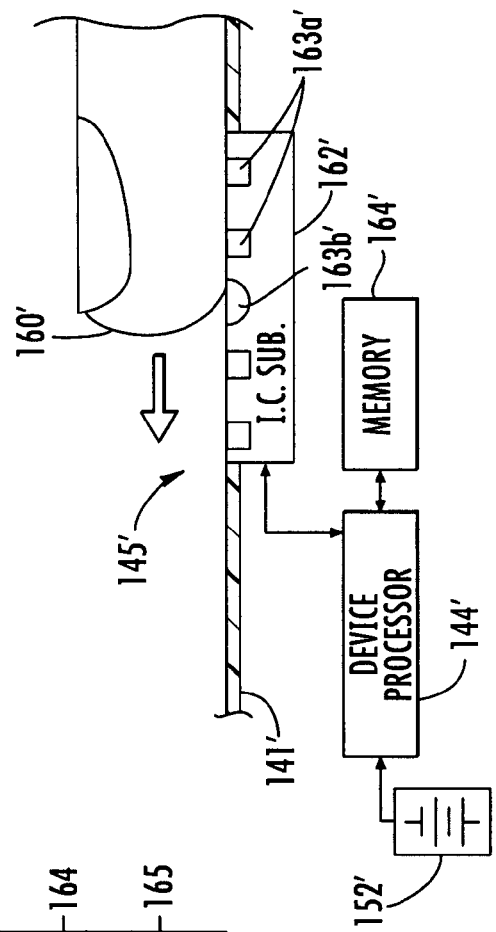

MULTI-BIOMETRIC FINGER SENSOR INCLUDING OPTICAL DISPERSION SENSING PIXELS AND ASSOCIATED METHODS

CROSS-REFERENCE TO RELATED APPLICATIONS

This application claims benefit, under 35 U.S.C. 119(e), from U.S. Provisional Application Ser. No. 60/500,475, filed Sep. 5, 2003 and U.S. Provisional Application Ser. No. 60/536,305 filed Jan. 14, 2004, the entire disclosures of which are incorporated herein by reference.

FIELD OF THE INVENTION

The present invention relates to biometric sensing, and, more particularly to biometric sensing using integrated circuit biometric sensors and associated methods.

BACKGROUND OF THE INVENTION

Fingerprint sensing and matching is a reliable and widely used technique for personal identification or verification. In particular, a common approach to fingerprint identification involves scanning a sample fingerprint or an image thereof and storing the image and/or unique characteristics of the fingerprint image. The characteristics of a sample fingerprint may be compared to information for reference fingerprints already in a database to determine proper identification of a person, such as for verification purposes.

A particularly advantageous approach to fingerprint sensing is disclosed in U.S. Pat. No. 5,953,441 to Setlak and assigned to the assignee of the present invention. The fingerprint sensor is an integrated circuit sensor that drives the user's finger with an electric field signal and senses the electric field with an array of electric field sensing pixels on the integrated circuit substrate. The patent to Setlak also discloses an approach to reduce spoofing by sensing another biometric characteristic of the user's finger, in particular, the same electric field sensing pixels are used to determine a complex impedance of the object presented to the sensor. Spoof reduction circuitry determines if the complex impedance of the presented object is indicative of a live finger. In other words, the Setlak patent discloses a biometric authentication approach that relies on multiple biometrics of the user's finger.

Other multi-biometric approaches may use various combinations of voice recognition, facial recognition, fingerprint recognition, and signature dynamics, for example. To satisfy the system, a user must satisfy several of the selected biometrics independently. Such systems may show enhanced selectivity over single biometric systems because false matches in one biometric characteristic are uncorrelated to false matches to a second biometric characteristic. Such a multi-biometric system may be more difficult to spoof, because each of the biometrics needs to be spoofed to compromise the system as a whole.

Representative of multi-biometric systems is, for example, U.S. Patent Application Publication No. 2002/0138768 to Murakami et al. This reference discloses sensing a heartbeat waveform that is substantially, but not necessarily completely unique, as a first biometric trait or characteristic. A second biological trait is used in conjunction with the first biological trait that is preferably also a live physiological trait. Examples of live, potentially substantially unique biological traits include the depth of the various layers of epithelial tissue from a given point on an individual's skin surface. The density of a particular kind of connective tissue, such as bone density, may be another substantially unique histological trait. Likewise, the light absorption characteristics of skin tissue or the visual retinal patterns of an iris could be substantially unique traits. Along these lines, U.S. Patent Application Publication No. 2003/0128867 to Bennett and U.S. Pat. No. 6,483,929 to Murakami et al. both disclose a biometric system that injects infrared energy into the user's finger and senses resulting infrared energy from the user's finger, such as to obtain the user's heartbeat as a biometric.

U.S. Pat. No. 6,327,376 to Harkin discloses a multi-biometric sensor including capacitive sensing pixels below a glass transparent sensing surface for sensing the ridge pattern of the user's finger. The sensor may also include an additional sensor of the contactless kind which relies for its sensing on the use of light, such as visible or infrared light, that can be positioned behind the capacitive fingerprint sensing array.

U.S. Pat. No. 6,560,352 to Rowe et al. discloses a biometric analysis based on using near-ultraviolet, visible, very near-infrared, or near-infrared energy and combinations thereof. U.S. Pat. No. 5,351,303 to Willmore discloses a biometric system that senses and compares the infrared image pattern from an individual's finger to another infrared image pattern of the same finger stored within system memory. Other biometric sensing approaches are also disclosed using ultrasonic imaging, such as U.S. Pat. No. 5,689,576 to Schneider et al. and U.S. Pat. No. 5,737,439 to Lapsley et al., for example.

Unfortunately, the prior art multi-biometric systems may have significant drawbacks. Those having two different sensors are relatively complicated, and expensive to install and operate. Those that require multiple presentations of a user's body part, for example, are inconvenient. The requirement for multiple steps also slows the process. Independent sensors may also be spoofed independently. Of course, there is a continuing need to also further develop even single biometric sensors and systems.

SUMMARY OF THE INVENTION

In view of the foregoing background, it is therefore an object of the present invention to provide an accurate, compact, and reliable finger multi-biometric sensor and associated methods.

These and other objects, features and advantages in accordance with the present invention are provided by a multi-biometric finger sensor including at least one optical dispersion sensing pixel on an integrated circuit substrate for sensing dispersed light from the user's finger, and at least one other finger biometric characteristic sensor on the integrated circuit substrate for sensing a finger biometric characteristic different than the dispersed light from the user's finger. The sensor apparatus may also include a processor connected to the at least one optical dispersion sensing pixel, and the at least one other finger biometric characteristic sensor. Accordingly, the optical at least one dispersion sensing pixel can be combined with another biometric sensor to provide more accurate results, for example, in a compact sensor package based on integrated circuit technology.

The sensor apparatus may also include an optical source for directing light into a user's finger when positioned adjacent the integrated circuit substrate. The light may propagate into and be dispersed by the user's finger so that at least a portion of the dispersed light exits the user's finger in a direction toward the integrated circuit substrate.

The at least one other finger biometric characteristic sensor may comprise a plurality of infrared sensing pixels. Alternately or additionally, the at least one other finger biometric characteristic sensor may comprise a plurality of electric field sensing pixels.

The processor may include a matcher connected to the at least one optical dispersion sensing pixel, and the at least one other biometric sensor. The at least one optical dispersion sensing pixel and the at least one other finger biometric sensor may operate based upon static placement of the user's finger adjacent the integrated circuit substrate. Alternately, the at least one optical dispersion sensing pixel and the at least one other finger biometric sensor may operate based upon sliding placement of the user's finger adjacent the integrated circuit substrate.

The multi-biometric finger sensor may further comprise an uppermost dielectric passivation layer over the plurality of optical dispersion sensing pixels and the at least one other biometric sensor and upon which the user's finger is positioned. In addition, the integrated circuit substrate may comprise single crystal silicon, or thin film substrate material, for example.

A method aspect of the invention is directed to multi-biometric finger sensing. The method may include receiving a user's finger adjacent an integrated circuit substrate, and sensing dispersed light from the user's finger by using at least one optical dispersion sensing pixel on the integrated circuit substrate. The method may also include sensing a finger biometric characteristic different than the dispersed light from the user's finger by using at least one other finger biometric characteristic sensor on the integrated circuit substrate.

BRIEF DESCRIPTION OF THE DRAWINGS

FIG. 3 is a more detailed schematic diagram, partially in section, of a portion of the electronic device as shown in FIG. 1.

FIG. 4 is a more detailed schematic diagram, partially in section, of a portion of the electronic device as shown in FIG. 2.

FIG. 9 is a more detailed schematic diagram, partially in section, of a portion of the electronic device as shown in FIG. 7.

FIG. 10 is a more detailed schematic diagram, partially in section, of a portion of the electronic device as shown in FIG. 8.

FIG. 20 is a more detailed schematic diagram, partially in section, of a portion of the electronic device as shown in FIG. 18.

FIG. 21 is a more detailed schematic diagram, partially in section, of a portion of the electronic device as shown in FIG. 19.

DETAILED DESCRIPTION OF THE PREFERRED EMBODIMENTS

The present invention will now be described more fully hereinafter with reference to the accompanying drawings, in which preferred embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like numbers refer to like elements throughout, and prime notation is used to indicate similar elements in alternate embodiments.

Figure 1:
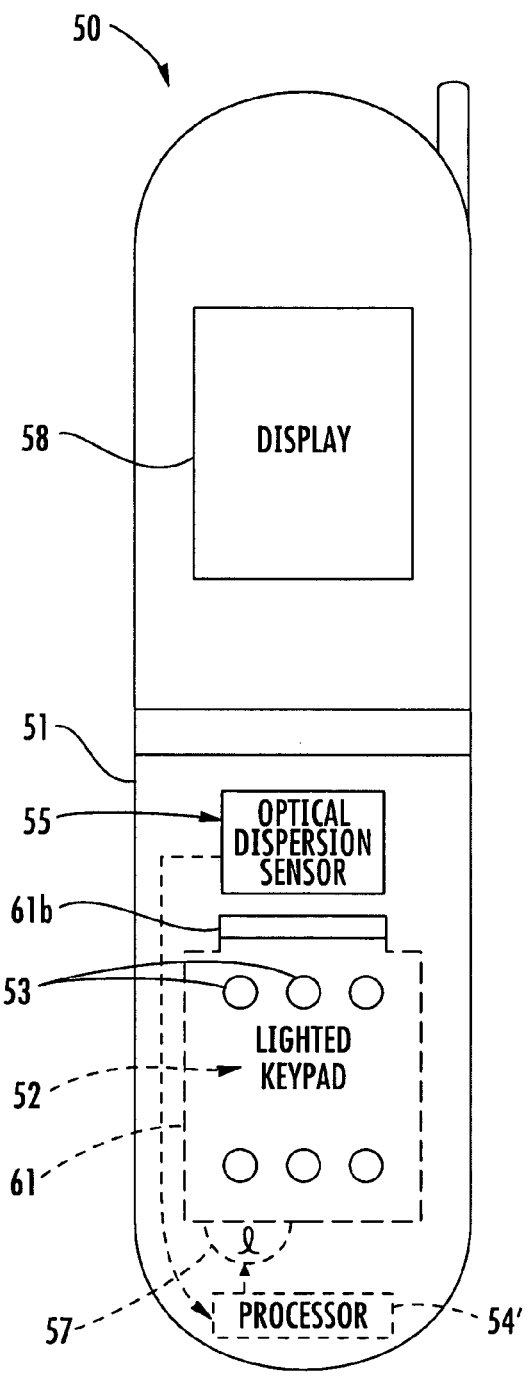
FIG. 1 is a schematic diagram of a first embodiment of an electronic device including an optical dispersion finger sensor in accordance with the present invention.
Figure 2:
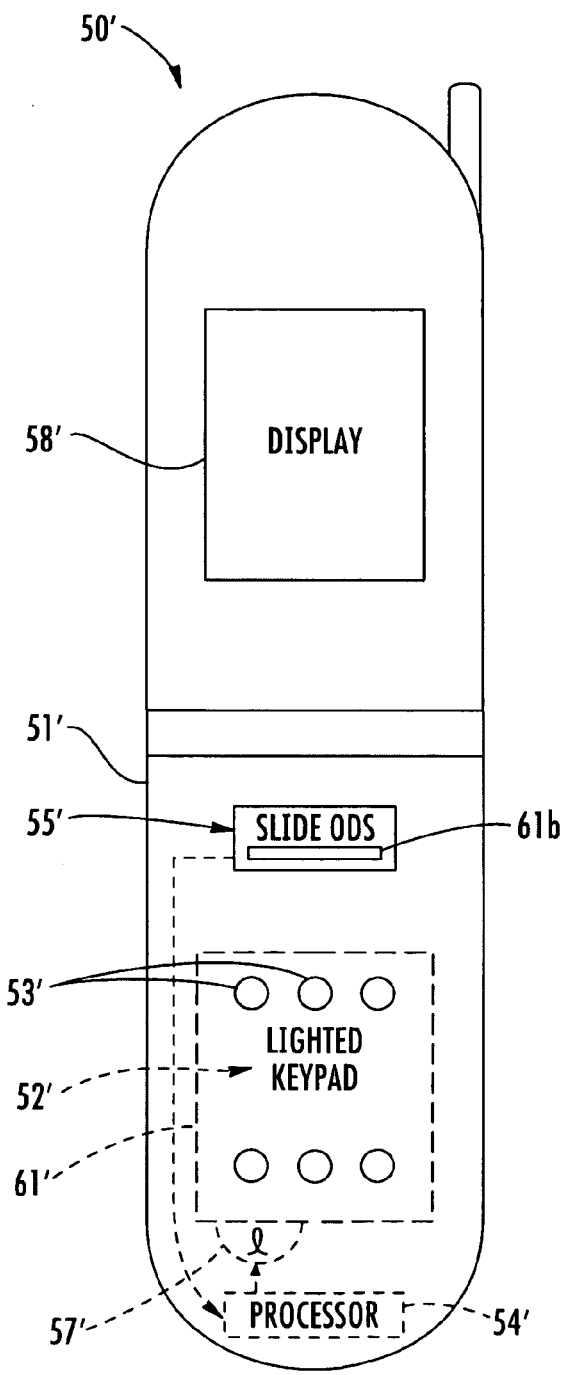
FIG. 2 is a schematic diagram of a second embodiment of an electronic device including an optical dispersion finger sensor in accordance with the present invention.
Figure 6:
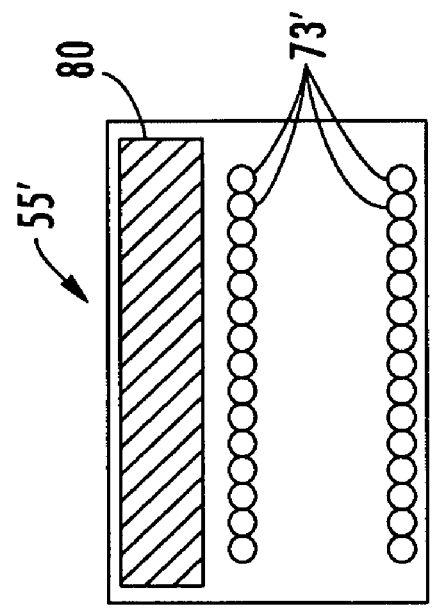
FIG. 6 is a schematic top plan view of the optical dispersion sensor as shown in FIG. 2.

Referring initially to FIGS. 1–6, optical dispersion finger sensing as a biometric characteristic is first described. With particular reference to FIGS. 1 and 3, the electronic device is in the exemplary form of a cellular telephone 50 that includes a portable housing 51. The portable housing 51 carries an optical dispersion finger sensor 55, and a lighted keypad 52 that, in turn, includes a plurality of user operable input keys 53. The portable housing 51 also carries a processor 54 that is connected to the optical dispersion sensor 55 and the optical source 57. A display 58 is illustratively carried by the upper portion of the portable housing 51 and is also connected to the processor 54.

The cellular phone 50 may also include a power source, such as a rechargeable battery 62, carried by the portable housing 51 and connected to the processor 54 and other electronic components within the housing as will be appreciated by those skilled in the art. A memory 64 is also connected to the processor 54. The optical source 57 is coupled to the keys 53 of the lighted keypad 52 by an optical guide 61 that may be a plastic body for conducting light therethrough. The optical source 57 may be an LED or electroluminescent source, for example.

Considered in other terms, the optical guide 61 may have an input 61a coupled to the optical source 57 and a first output 61b exposed through an opening in the housing 51. A second output 61c is illustratively coupled to the keys 53 as will be appreciated by those skilled in the art. The use of the onboard optical source 57 and the minor modification to the optical guide 61 provides a relatively inexpensive approach to couple light into the user's finger 70 for optical dispersion sensing.

Of course, in other embodiments a dedicated optical source may be carried by the portable housing 51. Such a dedicated optical source would permit independent control from the lighted keypad 52, for example.

The optical dispersion sensor 55 includes an integrated circuit substrate 72 and a plurality of optical dispersion sensing pixels 73 on the integrated circuit substrate for sensing dispersed light from the user's finger 70. In other embodiments, as few as one optical dispersion sensing pixel 73 may be used. More particularly, the optical source provided by the exposed optical guide output 61b directs light into a user's finger 70 when positioned adjacent the integrated circuit substrate 72. The light propagates into and is dispersed by the internal tissue of the user's finger 70 so that at least a portion of the dispersed light exits the user's finger in a direction toward integrated circuit substrate 72. This dispersed light is captured by the optical sensing pixels 73.

The processor 54 is connected to the optical dispersion sensing pixels 73 for generating optical dispersion biometric data based upon dispersed light from the user's finger 70. As will be discussed in greater detail below, the optical dispersion biometric data may comprise light intensity data along at least one dimension of the user's finger 70, for example. The optical dispersion biometric data may additionally or alternately comprise subdermal structure data for the user's finger.

In addition, the processor 54 further illustratively includes a matcher 74 for determining a match between the optical dispersion biometric data of the user's finger and stored optical dispersion biometric data for an enrolled user. This match determination, in turn, may be used by a function enabler 75 of the processor to enable at least one device function, such as permitting operation of the transmit and receive functions of the cellular telephone 50, for example. The matcher 74 and enabler 75 may be implemented on a CPU of the processor 54 operating under stored program control, as will be appreciated by those skilled in the art without requiring further discussion herein.

Those of skill in the art will appreciate other device functions that may be controlled, such as access to data if the electronic device were a Personal Digital Assistant (PDA), for example. Of course, many other electronic devices may benefit from the optical dispersion finger sensing, and these devices may include other access limited functions. The optical dispersion biometric data may be accurately and efficiently obtained using the compact integrated circuit-based sensor 55.

Another aspect of the optical dispersion sensor 55 is that its processing may be self-contained on the integrated circuit 72 itself, or, as shown in the illustrated embodiment, the integrated circuit may contain some of the processing circuitry 77. For example, pixel reading amplifiers and/or other image processing active devices may be provided on the substrate 72 using conventional CMOS technology. In yet other embodiments, all or a majority of the signal processing circuitry may be located off-chip. The integrated circuit substrate 72 may comprise a single crystal silicon substrate in some embodiments, or a thin film technology, such as a glass substrate, for example, in other embodiments as will be appreciated by those skilled in the art.

The illustrated embodiment of the optical dispersion sensor 55 is a static placement sensor. In other words, the size of the array of pixels 73 is relatively large compared to a sliding placement sensor as discussed below. Also, for the static placement sensor 55, the processor 54 generates the optical dispersion biometric data based upon static placement of the user's finger adjacent the integrated circuit substrate 72.

Referring now more particularly to FIGS. 2, and 4–6 another class of embodiments of optical dispersion finger sensor 55' is now described. In these embodiments, the optical source is in the form of one or more LED optical sources 80 on the integrated circuit substrate 72' itself. The illustrated optical sensor 55, is also in the form of a sliding placement sensor that has a smaller sensing area over which the user slides his finger 70' as will be appreciated by those skilled in the art. In these embodiments, the processor 54' may collect frames of optical dispersion data from the optical dispersion sensing pixels 73'. In other embodiments, the LED optical sources 80 could also be used on the static placement sensor 55 described above.

Figure 5:
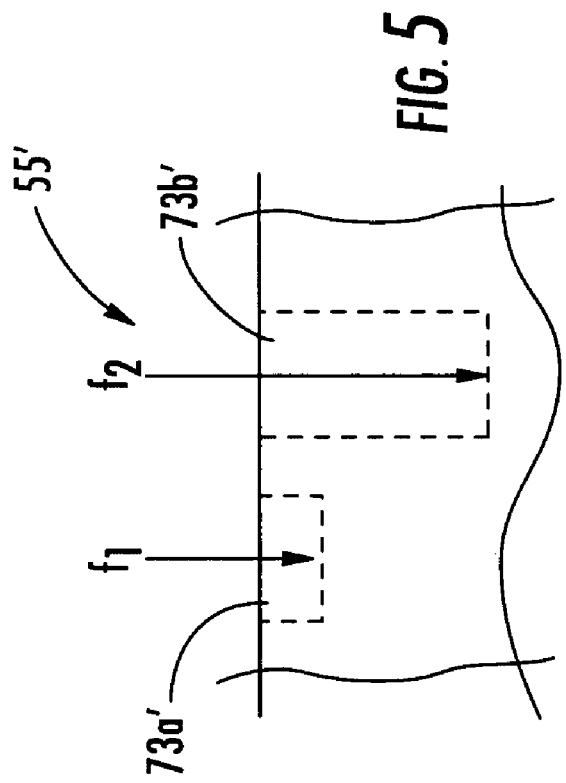
FIG. 5 is a greatly enlarged, schematic cross-sectional view of a variation of a portion of the infrared sensor as shown in FIG. 2.

Referring more specifically to FIG. 5, the plurality of optical dispersion sensing pixels may comprise optical dispersion sensing pixels 73a', 73b' having different frequency sensitivities f1, f2 within a broadband frequency range of the light from the LED 80 or optical source 57 (FIG. 3). For example, as shown in the illustrated embodiment, the optical dispersion sensing pixels may comprise buried optical detectors in the form of P/N junction detectors 73a', 73b' being buried at different depths to provide different frequency sensitivities. In other words, the height of the semiconductive material above a buried P/N sensing junction 73a', 73b' can act as a filter for different frequencies. Other filtering or frequency selection techniques are also contemplated including filter coatings, for example. More than two frequencies can also be selected by extension of these disclosed techniques as will be appreciated by those skilled in the art.

Those other elements of the second embodiment of the cellular telephone 50' are similar to those of the first embodiment of the cellular telephone 50 described above, and are indicated with prime notation. Accordingly, these elements require no further discussion herein.

Referring again to FIGS. 1–6, a method aspect is directed to optical dispersion finger sensing. The method may comprise receiving a user's finger 70, 70' adjacent an integrated circuit substrate 72, 72', and directing light from an optical source 57, 80 into a user's finger when positioned adjacent the integrated circuit substrate. The light may propagate into and be dispersed by the user's finger 70, 70' so that at least a portion of the dispersed light exits the user's finger in a direction toward the integrated circuit substrate 72, 72'. The method may also include sensing dispersed light from the user's finger using a plurality of optical dispersion sensing pixels 73, 73' on the integrated circuit substrate 72, 72', and generating optical dispersion biometric data based upon dispersed light from the user's finger 70, 70'. The method may also include enabling at least one device function based upon the optical dispersion biometric data from the user's finger 70, 70'.

As will be appreciated by those skilled in the art, the same set of optical dispersion sensing pixels 73, 73' may also be used for pulse/oximetry measurements. This may be done by extracting the cardiac pulse waveform and detecting minute changes in the red to infrared intensity ratio caused by the periodic arrival of freshly oxygenated blood.

Figure 7:
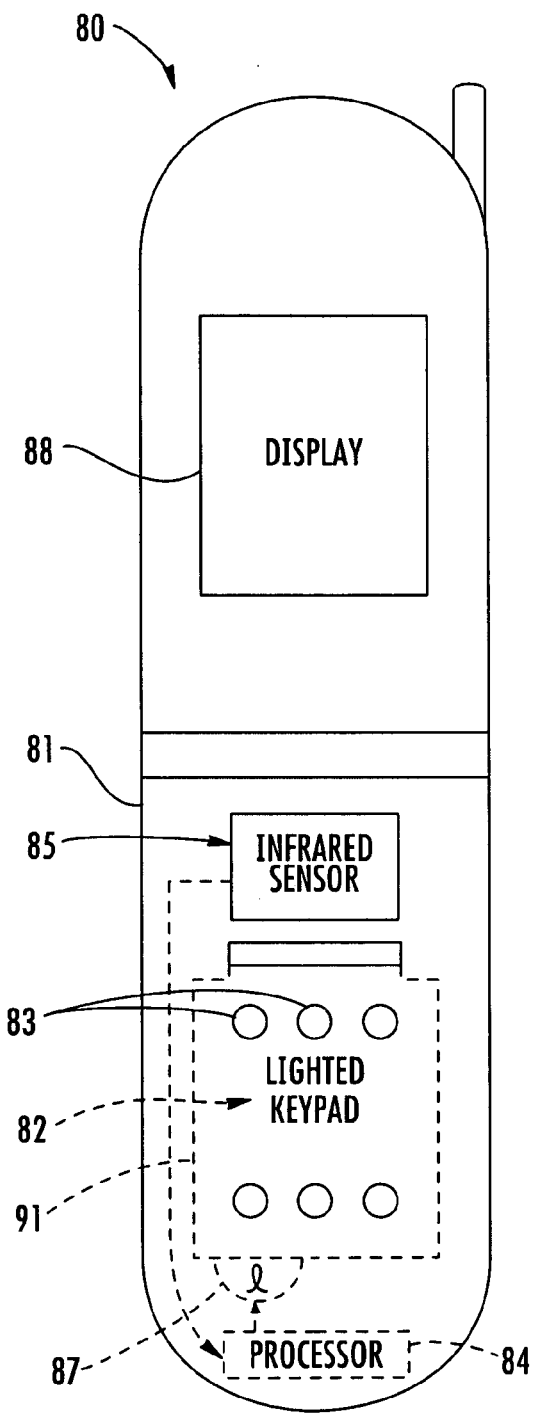
FIG. 7 is a schematic diagram of a first embodiment of an electronic device including an infrared finger sensor in accordance with the present invention.

Referring now to FIGS. 7–10, various embodiments of infrared sensing pixel finger sensors 85, 85' are first described. With particular reference to FIGS. 7 and 9, the electronic device is in the exemplary form of a cellular telephone 80 that includes a portable housing 81. The portable housing 81 carries an infrared finger sensor 85, and a lighted keypad 82 that, in turn, includes a plurality of user operable input keys 83. The portable housing 81 also carries a processor 84 that is connected to the infrared sensor 85 and the optical source 87 for lighting the keypad 82 via the optical guide 91. A display 88 is illustratively carried by the upper portion of the portable housing 81 and is also connected to the processor 84.

The cellular phone 80 may also include a power source, such as a rechargeable battery 92, carried by the portable housing 81 and connected to the processor 84 and other electronic components within the housing as will be appreciated by those skilled in the art. A memory 94 is also connected to the processor 84.

The infrared sensor 85 includes an integrated circuit substrate 102 and a plurality of infrared sensing pixels 103 on the integrated circuit substrate for sensing infrared radiation naturally emitted from subdermal features of the user's finger 100. The processor 84 is connected to the infrared sensing pixels 83 for generating the infrared biometric data based upon naturally emitted radiation from subdermal features of the user's finger 100.

The processor 84 further illustratively includes a matcher 104 for determining a match between the infrared biometric data of the user's finger and stored infrared biometric data for an enrolled user. This match determination, in turn, may be used by a function enabler 105 of the processor 84 to enable at least one device function, such as permitting operation of the transmit and receive functions of the cellular telephone 80, for example. The matcher 104 and enabler 105 may be implemented on a CPU of the processor 84 operating under stored program control, as will be appreciated by those skilled in the art without requiring further discussion herein.

Those of skill in the art will appreciate other device functions that may be controlled, such as access to data if the electronic device were a PDA, for example. Of course, many other electronic devices may benefit from the infrared finger sensing, and these devices may include other access limited functions. The infrared biometric data may be accurately and efficiently obtained using the compact integrated circuit-based sensor 85.

Another aspect of the infrared sensor 85 is that its processing may be self-contained on the integrated circuit substrate 102 itself, or, as shown in the illustrated embodiment, the integrated circuit may contain some of the processing circuitry 107. For example, pixel reading amplifiers and/or other image processing active devices may be provided on the substrate 102 using conventional CMOS technology, for example. In yet other embodiments, all or a majority of the signal processing circuitry may be located off-chip. The integrated circuit substrate 102 may preferably a silicon substrate as will be appreciated by those skilled in the art.

The illustrated embodiment of the infrared sensor 85 is a static placement sensor. In other words, the size of the array of pixels 103 is relatively large compared to a sliding placement sensor as discussed below. Also, for the static placement sensor 105, the processor 104 generates the infrared biometric data based upon static placement of the user's finger adjacent the integrated circuit substrate 102.

Figure 8:
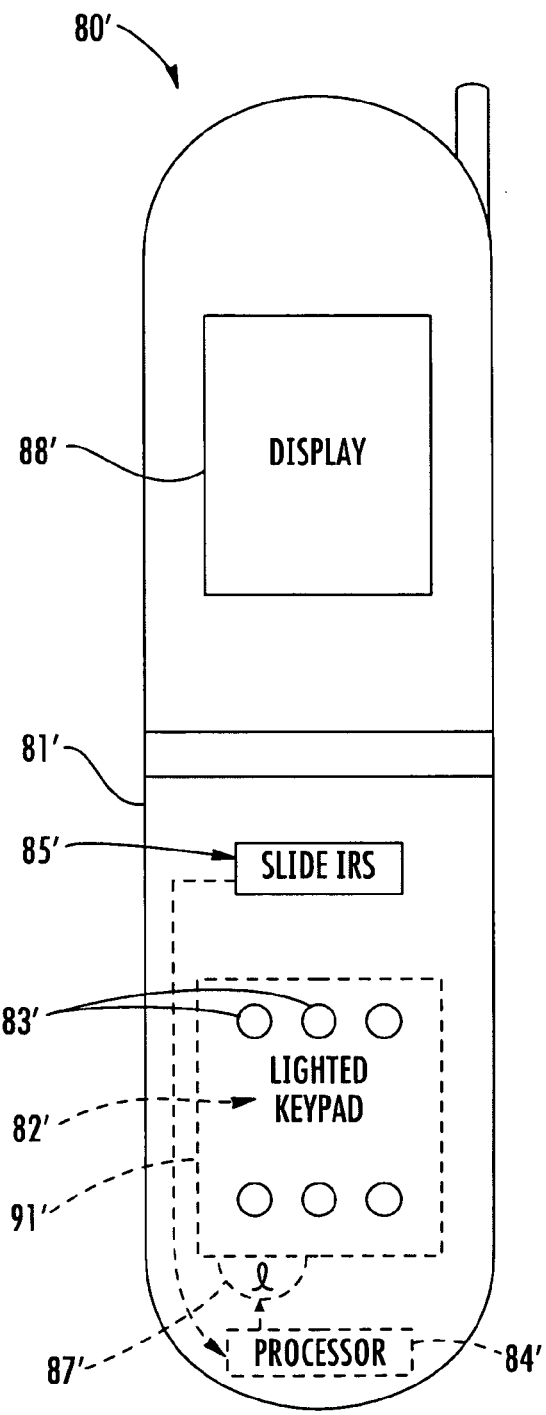
FIG. 8 is a schematic diagram of a second embodiment of an electronic device including an infrared finger sensor in accordance with the present invention.

Referring now more particularly to FIGS. 8 and 10, another class of embodiments of infrared finger sensor 85' is now described. In these embodiments, the illustrated infrared sensor 85' is in the form of a sliding placement sensor that has a smaller sensing area over which the user slides his finger 100' as will be appreciated by those skilled in the art. In these embodiments, the processor 104' may collect frames of infrared image data from the infrared sensing pixels 103'.

Those other elements of the embodiment of the cellular telephone 80' shown in FIGS. 8 and 10 are similar to those of the embodiment of the cellular telephone 80 described above with respect to FIGS. 7 and 9, and are indicated with prime notation. Accordingly, these elements require no further discussion herein.

Figure 11:
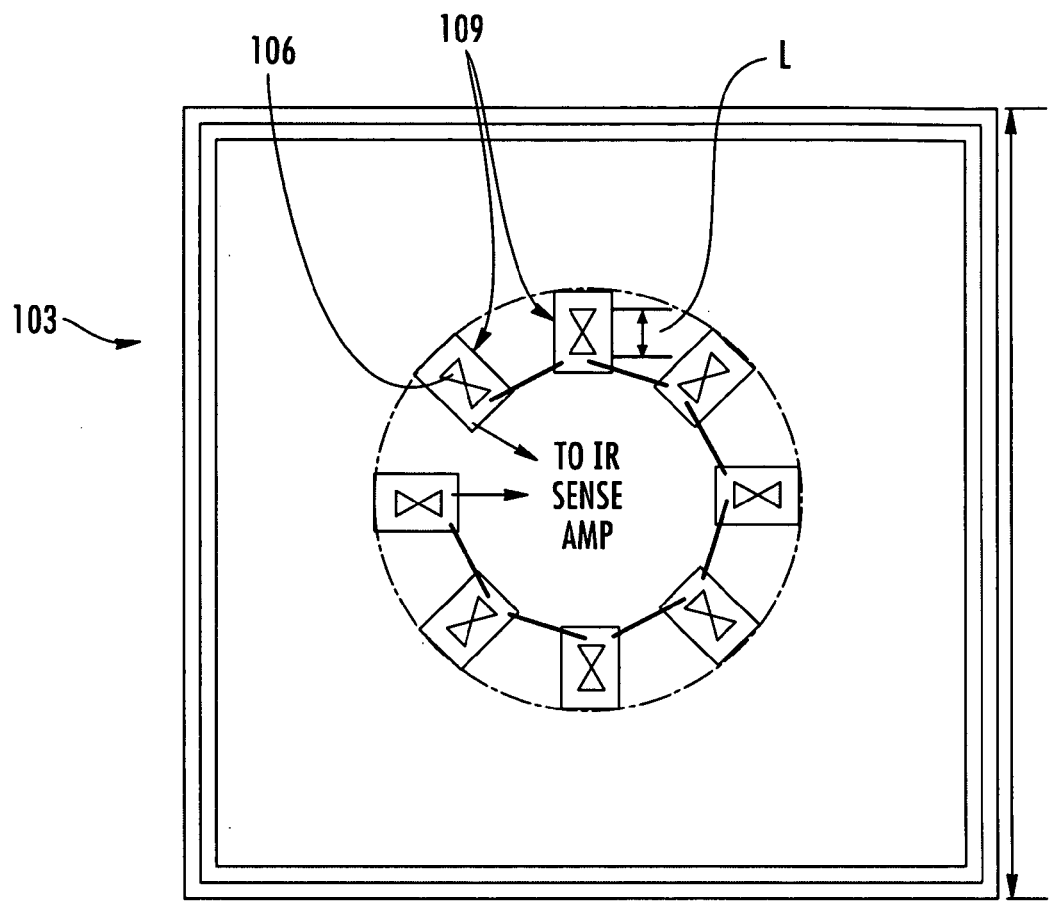
FIG. 11 is a schematic plan view of an infrared sensing pixel for the infrared sensor as shown in FIG. 7.

Turning now additionally to FIGS. 11 through 17, other detailed aspects of exemplary infrared sensing pixels 103 are now described. As shown in FIG. 11, for example, the infrared sensing pixel 103 includes an array of infrared sensing units 105 connected in series and whose output is fed to an infrared sensing amplifier (not shown). Each sensing unit 105 includes an infrared antenna in the form of a bowtie dipole antenna 106 having a relative small dimension to efficiently collect infrared energy as will be appreciated by those skilled in the art. For example, for infrared radiation at a wavelength of about 7 microns, the length L of the dipole antenna 106 may be about 3.5 microns. The overall size of the infrared sensing pixel 103 may be about 50 microns on each side as is consistent with the dimensions of a typical electric field sensing pixel as will be described in greater detail below. The infrared sensing pixels 103 may be at a density of 125 pixels per inch to capture subdermal patterns, and about 250 for ridge/valley imaging. Of course, other dimensions and types of infrared antennas may also be used as will be appreciated by those skilled in the art.

Figure 12:
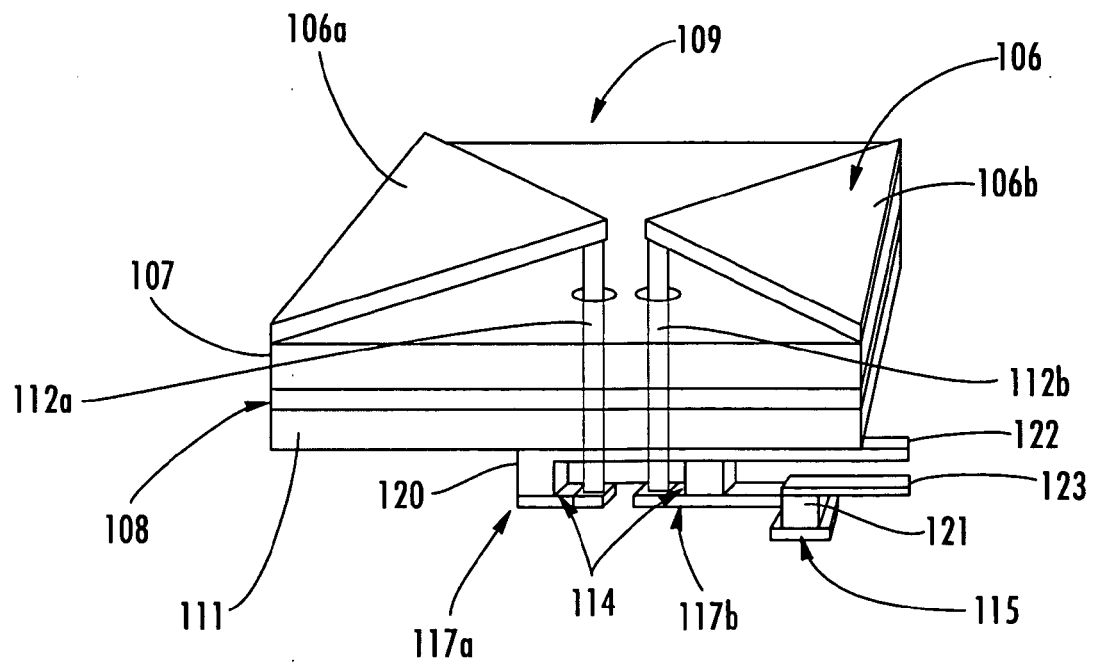
FIG. 12 is a schematic cross-sectional view of an individual infrared antenna and thermocouple temperature sensor for the infrared sensing pixel as shown in FIG. 11.
Figure 13:
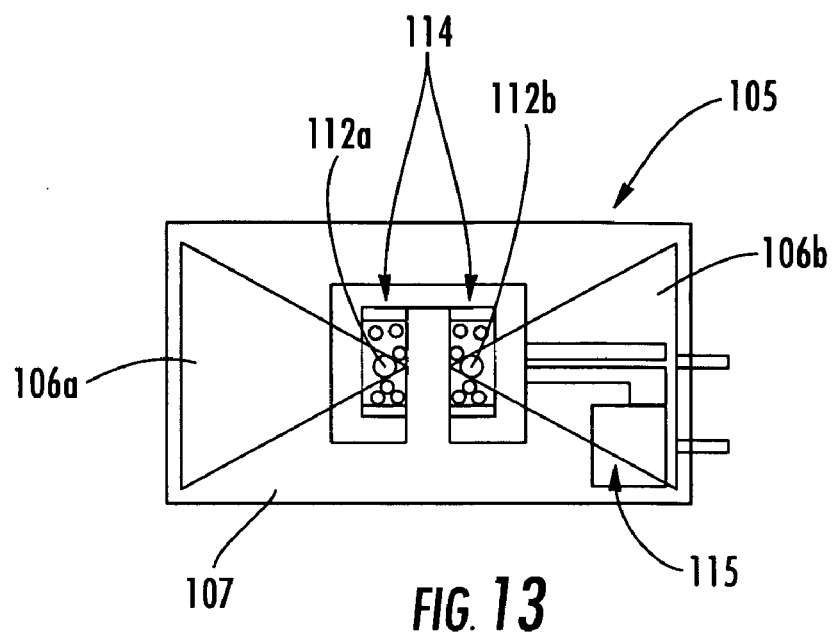
FIG. 13 is a top plan view of the infrared antenna element and thermocouple sensor as shown in FIG. 12.
Figure 15:
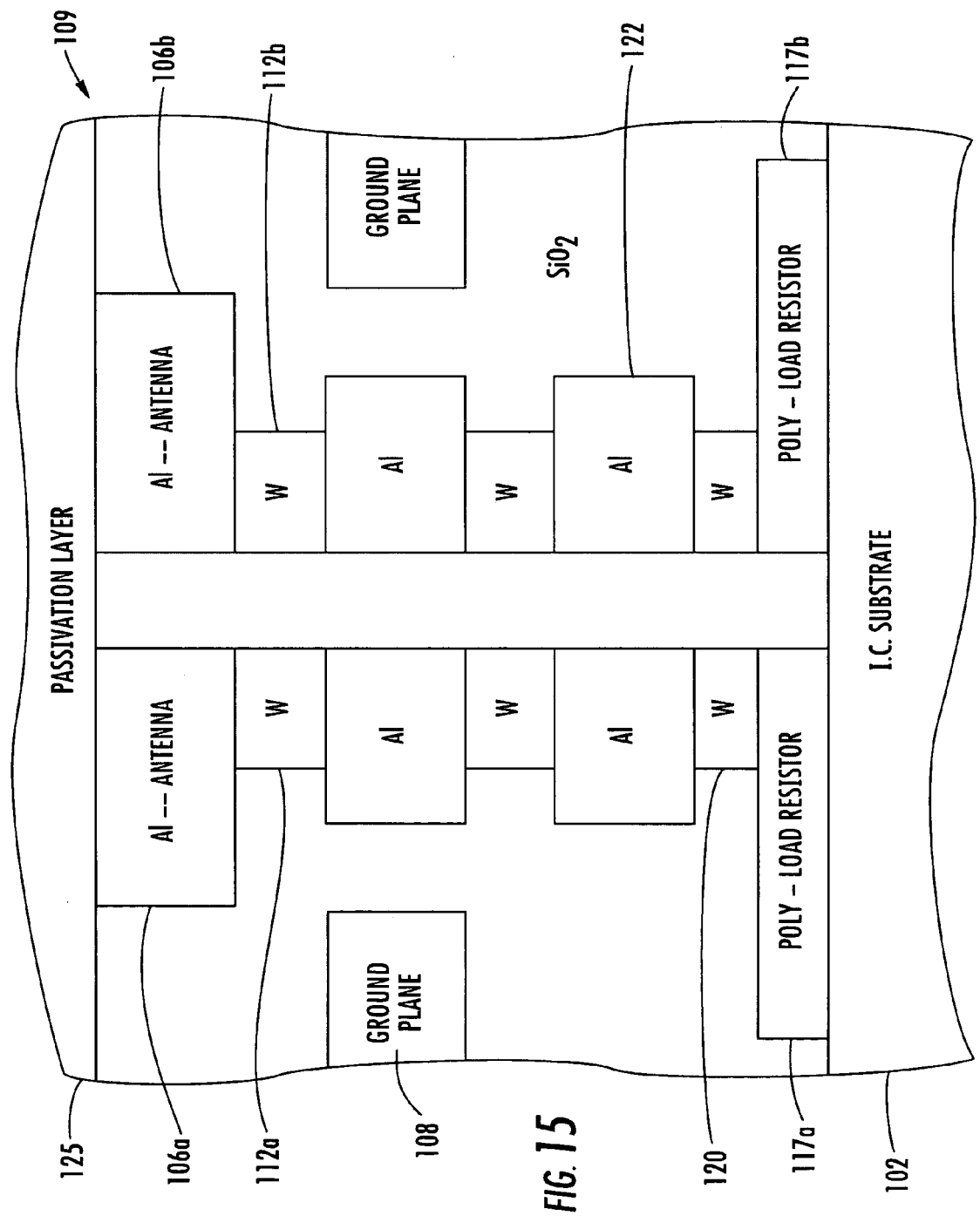
FIG. 15 is an enlarged schematic cross-sectional view through the middle of an individual infrared antenna and temperature sensor as shown in FIG. 12.

As shown in FIGS. 12, 13 and 15, the infrared sensing unit 109 may be advantageously formed using the various metal and polycrystalline layers, separated by interlevel dielectric layers, as are commonly used in semiconductor device processing. In the illustrated embodiment, the upper metal layer is patterned to form the two dipole antenna elements 106a, 106b of the bowtie dipole antenna 106. An interlevel dielectric layer 107 separates the dipole elements 106a, 106b from the underlying antenna ground plane 108 provided by patterning the second metal layer as will be appreciated by those skilled in the art. Another interlevel dielectric layer 111 separates the conductive antenna ground plane 108 from the circuitry patterned using the first metal layer.

Two conductive vias 112a, 112b carry the signal from the dipole antenna elements 106a, 106b to a temperature sensor in the form a thermocouple having a measuring junction 114 and a reference junction 115. Polysilicon dissipative regions 117a, 117b are used to match the impedance of about 300 ohms. Tungsten via portions 120, 121 illustratively connect to aluminum signal lines 122, 123, respectively, patterned on the first metal layer. The thermocouple junctions are defined between the polysilicon of the first poly layer and the aluminum of the first metal layer as will be appreciated by those skilled in the art. The reference junction 115 is also shown relatively close to the measuring junction 114 for clarity of explanation; however, in other advantageous embodiments, the reference junction may be spaced considerably further away from the measuring junction. As will also be understood by those of skill in the art, an upper passivation layer 125 (FIG. 17) is also provided over the dipole antenna 106.

The infrared unit 105 uses a thermocouple rather than a resistor, for example, to reduce power dissipation during imaging. Of course, in other embodiments, a resistor or bolometer may be used as the temperature sensor. Each infrared unit 105 may generate an output voltage of about 0.2 to 20 microvolts, for example.

Figure 14:
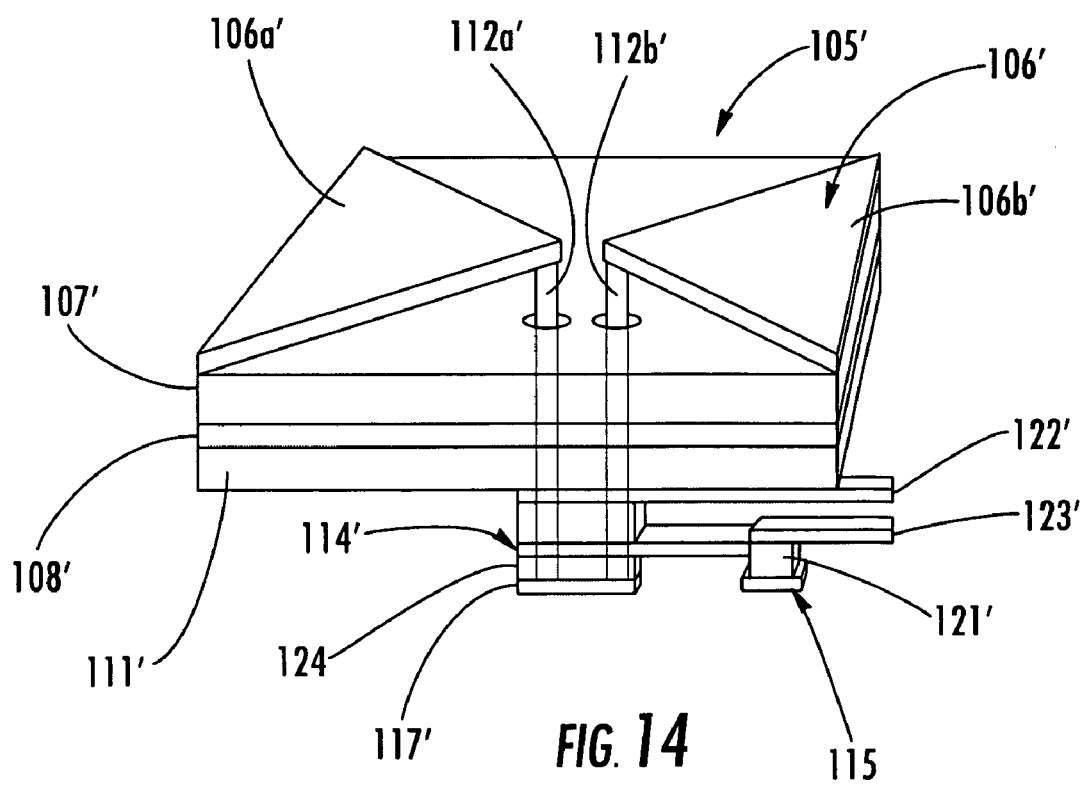
FIG. 14 is a schematic cross-sectional view of an alternate embodiment of an individual infrared antenna and thermocouple temperature sensor for the infrared sensing pixel as shown in FIG. 11.

Another embodiment of an infrared sensing unit 105' is explained with reference to FIG. 14. In this embodiment, the dropping resistor is provided by a portion of the substrate 117'. The ohmic region could also be the channel of an FET allowing modulation of the power dissipated by changing the gate voltage. The conductive vias 112a', 112b' allow conduction of the current wave from the dipole antenna 106' through to the lower layers of the integrated circuit device. In addition, a dielectric layer 124 is provided that may provide additional ESD protection as will be understood by those of skill in the art. Those other elements of the embodiment of FIG. 14, not specifically mentioned, are indicated by prime notation and are similar to elements described above with reference to FIGS. 12 and 13.

Figure 16:
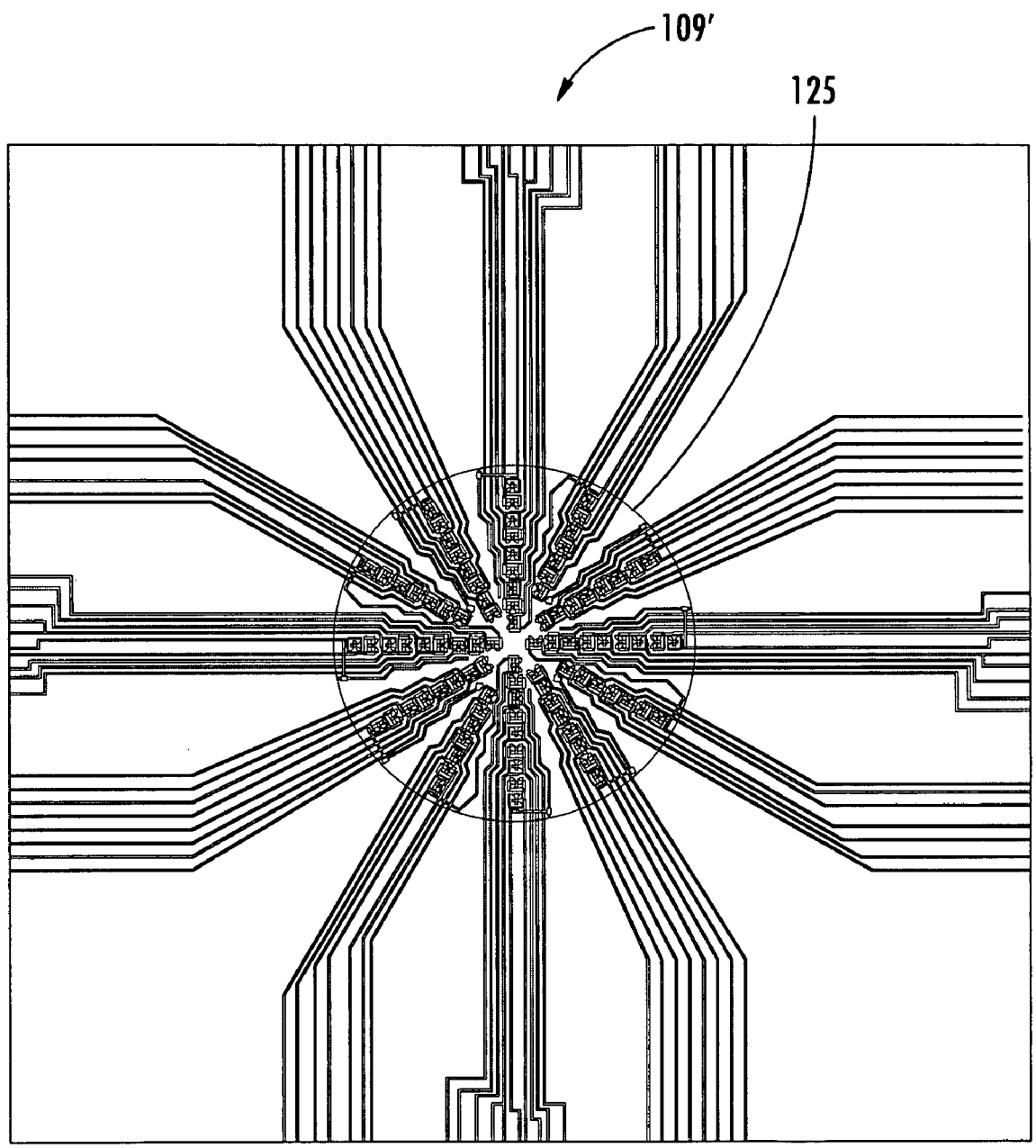
FIG. 16 is a top plan view of an individual infrared sensing pixel as may be used in the infrared sensor as shown in FIG. 7.
Figure 17:
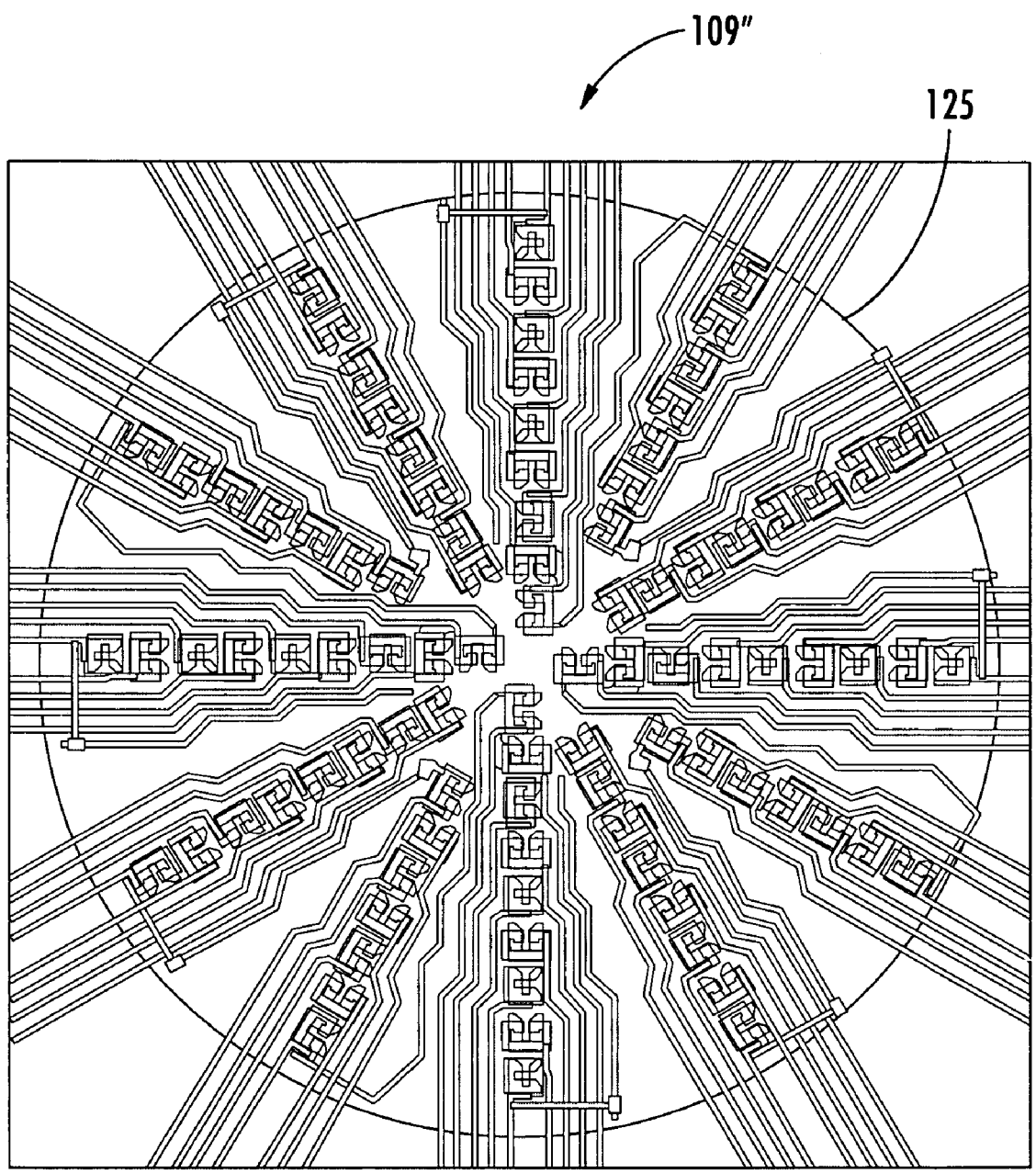
FIG. 17 is an enlarged top plan view from the center portion of FIG. 16.

As shown in top plan views of FIGS. 16 and 17, radial strings of infrared antennas are positioned within a circular aperture 125 through the ground plane of an infrared sensing pixel 103. The measuring junctions are positioned beneath the infrared antennas, while signal lines connect to the reference junctions that are positioned on the periphery of the overall pixel. The reference junctions are therefore obscured from the infrared radiation by the ground plane as will be appreciated by those skilled in the art. Of course, other layouts for the infrared pixels 103, 103' are also contemplated.

Referring again to FIGS. 7–17, another method aspect of the invention directed to infrared finger sensing is now described. The method may include receiving a user's finger 100, 100' adjacent an integrated circuit substrate 102, 102', and sensing infrared radiation emitted from subdermal features of the user's finger 100, 100' positioned adjacent the integrated circuit substrate by using a plurality of infrared sensing pixels 103, 103' on the integrated circuit substrate. Each infrared sensing pixel 103, 103' may comprise at least one temperature sensor, such as the thermocouple junctions 114, 115 and 114', 115' described above, and at least one infrared antenna 106, 106' above and connected to the at least one temperature sensor. The method may also include generating infrared biometric data based upon infrared radiation emitted from the subdermal features of the user's finger.

Figure 18:
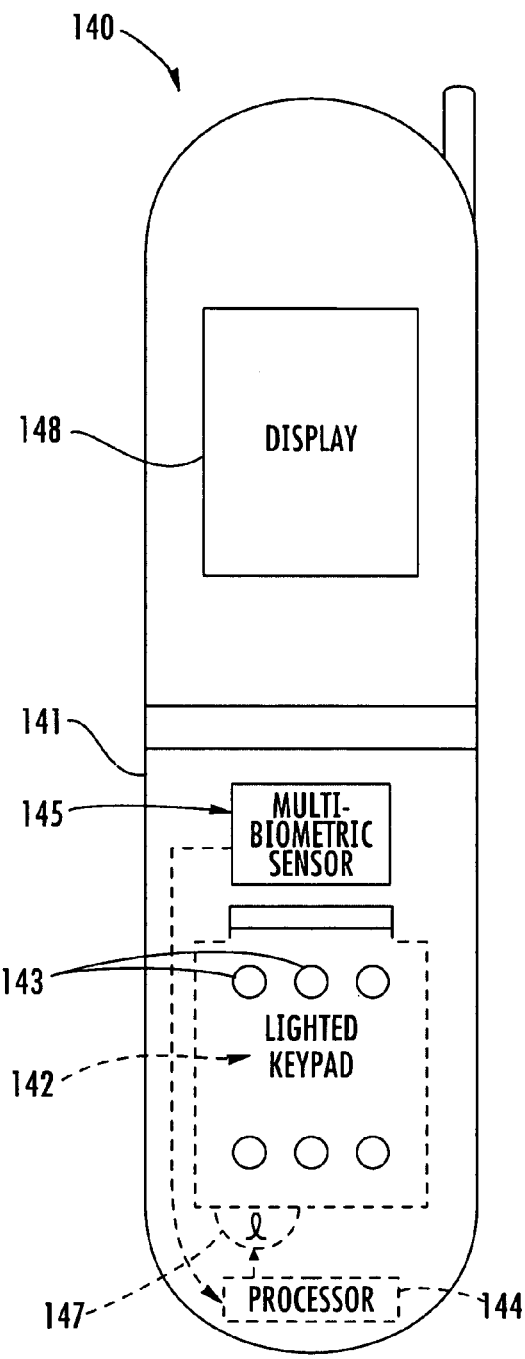
FIG. 18 is a schematic diagram of a first embodiment of an electronic device including a multi-biometric finger sensor in accordance with the present invention.

Referring now to FIGS. 18 through 21, various embodiments of multi-biometric sensing pixel finger sensors 85, 85' are first described. With particular reference to FIGS. 18 and 20, the electronic device is in the exemplary form of a cellular telephone 140 that includes a portable housing 141. The portable housing 141 carries a multi-biometric finger sensor 145, and a lighted keypad 142 that, in turn, includes a plurality of user operable input keys 143. The portable housing 141 also carries a processor 144 that is connected to the multi-biometric sensor 145 and the optical source 147 for lighting the keypad 142 via the optical guide 151. A display 148 is illustratively carried by the upper portion of the portable housing 141 and is also connected to the processor 144.

The cellular phone 140 may also include a power source, such as a rechargeable battery 152, carried by the portable housing 141 and connected to the processor 144 and other electronic components within the housing as will be appreciated by those skilled in the art. A memory 154 is also connected to the processor 144. The multi-biometric sensor 145 includes an integrated circuit substrate 162, a first set of biometric sensing pixels 103a on the integrated circuit substrate for sensing a first finger biometric characteristic to generate first finger biometric characteristic data having a first matching selectivity.

The sensor 145 also includes a second set of biometric sensing pixels 103b on the integrated circuit substrate 102 for sensing a second finger biometric characteristic different than the first finger biometric characteristic to generate second finger biometric characteristic data with a known spatial relationship to the first fingerprint characteristic data. The second finger biometric characteristic data may have a second matching selectivity less than the first matching selectivity. Accordingly, a lower selectivity characteristic can be combined with a higher selectivity to provide more accurate results, for example, in a compact sensor package based on integrated circuit technology.

The processor 144 is connected to first and second sets of sensing pixels 163a, 163b for generating the first and second biometric characteristic data. The first biometric characteristic data may comprise fingerprint image data, for example. Other imaging data establishing known locations on the user's finger 160, such as based upon minutiae patterns, could also be used, as well as other similar data establishing a known spatial relationship that may be correlated to the second biometric characteristic data. Accordingly, for these embodiments the processor 144 further illustratively includes a high/low selectivity correlator 159 for cooperating with the first and second sets of biometric sensing pixels 103a, 103b for spatially correlating the second finger biometric data relative to the fingerprint image data. To also provide a known temporal relationship between the data, the processor 144 may operate the first and second sets of biometric sensing pixels 103a, 103b substantially simultaneously.

A matcher 164 is connected to the correlator 169 for determining a match between the multi-biometric data of the user's finger 160 and stored multi-biometric biometric data for an enrolled user. This match determination, in turn, may be used by a function enabler 165 of the processor 144 to enable at least one device function, such as permitting operation of the transmit and receive functions of the cellular telephone 140, for example. The correlator 169, the matcher 164, and enabler 165 may be implemented on a CPU of the processor operating under stored program control, as will be appreciated by those skilled in the art without requiring further discussion herein.

Those of skill in the art will appreciate other device functions that may be controlled, such as access to data if the electronic device were a PDA, for example. Of course, many other electronic devices may benefit from the multi-biometric finger sensing, and these devices may include other access limited functions. The multi-biometric characteristic data may be accurately and efficiently obtained using the compact integrated circuit-based sensor 145.

Another aspect of the infrared sensor 85 is that its processing may be self-contained on the integrated circuit substrate 162 itself, or, as shown in the illustrated embodiment, the integrated circuit may contain some of the processing circuitry 167. For example, pixel reading amplifiers and/or other image processing active devices may be provided on the substrate 162 using conventional CMOS technology, for example. In yet other embodiments, all or a majority of the signal processing circuitry may be located off-chip. The integrated circuit substrate 162 may preferably a silicon substrate as will be appreciated by those skilled in the art.

The illustrated embodiment of the multi-biometric sensor 145 is a static placement sensor. In other words, the size of the array of pixels 163a, 163b is relatively large compared to a sliding placement sensor as discussed below. Also, for the static placement sensor 145, the processor 144 generates the multi-biometric characteristic data based upon static placement of the user's finger adjacent the integrated circuit substrate 162.

Figure 19:
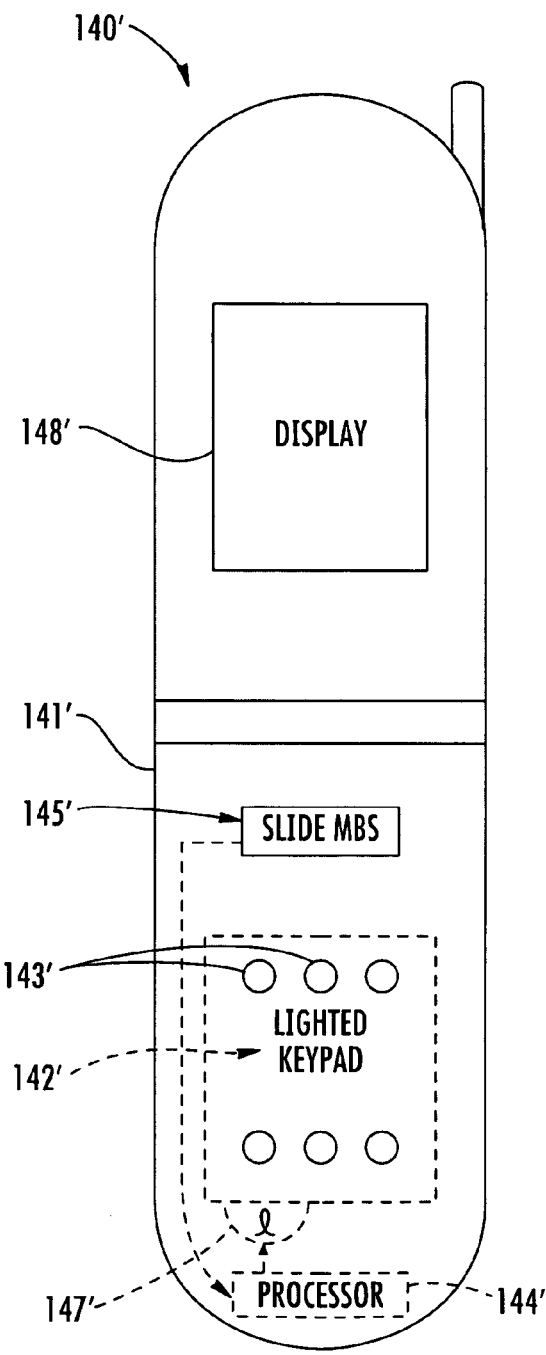
FIG. 19 is a schematic diagram of a second embodiment of an electronic device including a multi-biometric finger sensor in accordance with the present invention.

Referring now more particularly to FIGS. 19 and 21, another class of embodiments of multi-biometric finger sensors 145' is now described. In these embodiments, the illustrated multi-biometric sensor 145' is in the form of a sliding placement sensor that has a smaller sensing area over which the user slides his finger 160' as will be appreciated by those skilled in the art. In these embodiments, the processor 144' may collect frames of infrared biometric data from the sensing pixels 103a', 103b'.

U.S. Pat. No. 5,351,303 to Willmore schematically discloses a contact sensor for reading the infrared profile of the finger, but no successful implementation of the method described is known to date. Such an infrared sensor may suffer from sensitivity to both conducted thermal energy and radiated thermal energy. In the finger contact application, the conducted thermal energy is generally dominant, and in it the pattern of the finger surface friction ridges dominates. The patterns of the subdermal sources, such as the arterial blood supply are overwhelmed by the strong ridge pattern signal. While reading the friction ridge pattern can be useful, that is not typically required for the infrared sensors in the multi-biometric sensor embodiments. In this case, the friction ridge pattern is noise, and the pattern of the subdermal features sources is the unique data the sensor is attempting to capture.

The infrared sensor arrays of the prior art may also suffer from the omni-directional sensitivity pattern of the pixels. Crosstalk between pixels may become a debilitating problem if the thermal structures to be imaged are farther away from the array than 3 or 4 times the pixel pitch. This is indeed the case when imaging the subdermal structures of the finger. To be successful, the pixels should have some form of focusing that minimizes crosstalk.

The infrared sensors 85, 85' as disclosed herein may use a differential thermal sensing that rejects heat conducted through the surface of the device (that contains primarily the friction ridge pattern) and detects radiant infrared heat (which contains patterns primarily representative of the subdermal arterial blood distribution). The antenna and temperature sensor structure provides the focusing to reduce or minimize crosstalk between the pixels and develop clean image of the subdermal thermal pattern. The infrared sensors 85, 85' can be fabricated in existing standard CMOS silicon foundry processes as will be appreciated by those skilled in the art.

Figure 22:
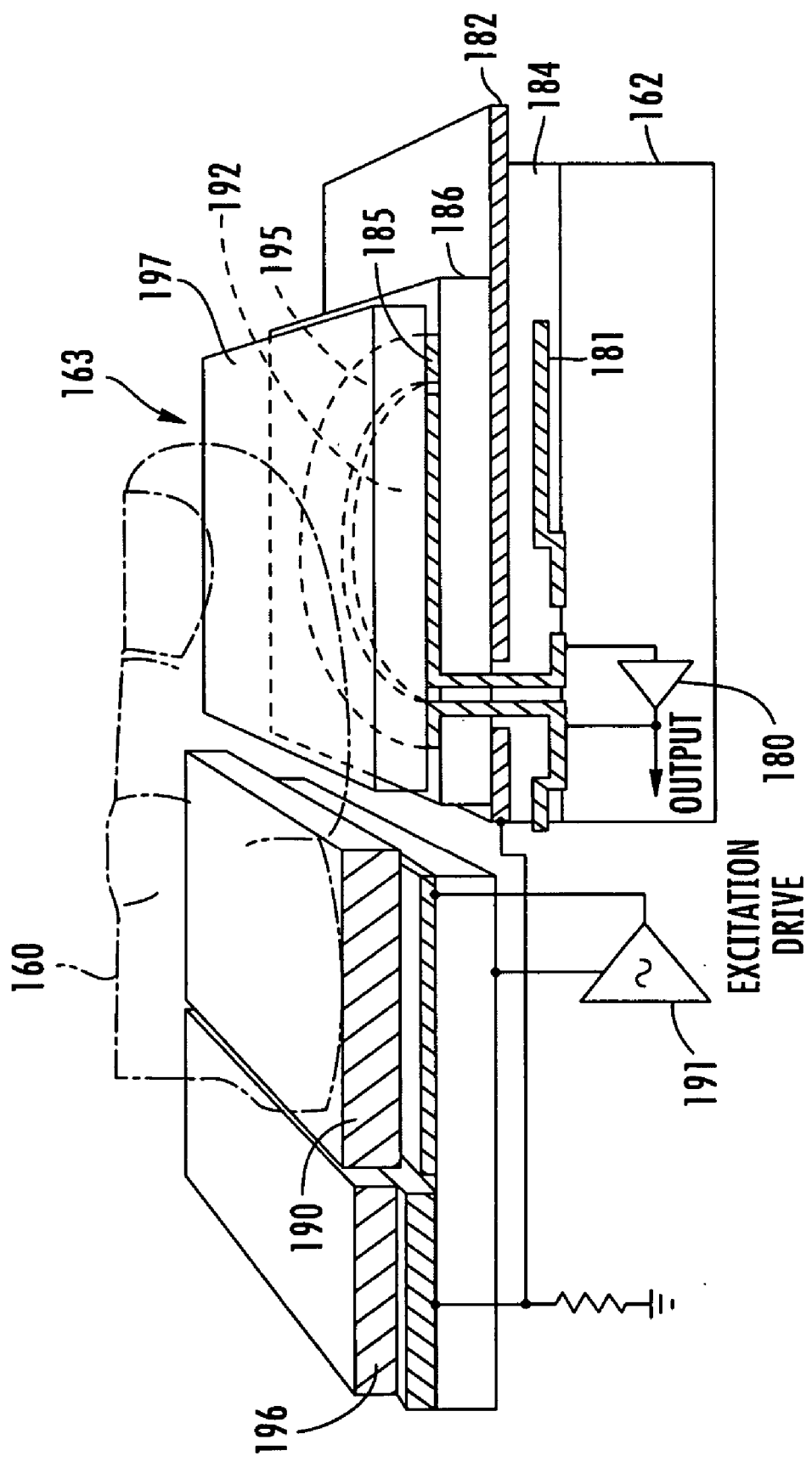
FIG. 22 is a schematic perspective view, partially in section, of an electric field finger sensing pixel as may be used in the multi-biometric finger sensor as shown in FIG. 18.

Those other elements of the embodiment of the cellular telephone 140' shown in FIGS. 18 and 21 are similar to those of the embodiment described above with respect to FIGS. 18 and 20, and are indicated with prime notation. Accordingly, these elements require no further discussion herein, Referring now additionally to FIG. 22, an embodiment of a high selectivity biometric characteristic sensing pixel 163a in the form of an electric field sensing pixel is now described. The electric field sensing pixel 163a may also be considered or referred to as an RF sensing pixel in view of its operating frequency as described below.

In particular, the electric field sensor pixel 163a includes one or more active semiconductor devices formed on the substrate 162, such as the schematically illustrated amplifier 180. A first metal layer 181 interconnects the active semiconductor devices. A second or ground plane electrode layer 182 is above the first metal layer 181 and separated therefrom by an insulating layer 184. A third metal layer 185 is positioned over another dielectric layer 186. In the illustrated embodiment, the a first external electrode 190 is connected to an excitation drive amplifier 191 which, in turn, drives the finger 160 with a signal that may be typically in the range of about 1 KHz to 1 MHz. Accordingly, the drive or excitation electronics are thus relatively uncomplicated and the overall cost of the electric field sensing pixel 163a may be relatively low, while the reliability is great.

An illustratively circularly shaped electric field sensing electrode 192 is on the insulating layer 186. The sensing electrode 192 may be connected to sensing integrated electronics, such as the illustrated amplifier 180 formed adjacent the substrate 162 as schematically illustrated, and as would be readily appreciated by those skilled in the art.

An annularly shaped shield electrode 195 surrounds the sensing electrode 192 in spaced relation therefrom. As would be readily appreciated by those skilled in the art, the sensing electrode 195 and its surrounding shield electrode 195 may have other shapes, such as hexagonal, for example, to facilitate a close packed arrangement or array of sensing pixels. The shield electrode 195 is an active shield which is driven by a portion of the output of the amplifier 180 to help focus the electric field energy and, moreover, to thereby reduce the need to drive adjacent electric field sensing electrodes.

The electric field sensing pixel 163a also illustratively includes an upper passivation layer 197, and an optional ESD electrode 196. The electric field sensor pixel 163a includes only three metal or electrically conductive layers 181, 182 and 185/195. The sensing pixels 163a can be made without requiring additional metal layers that would otherwise increase the manufacturing cost, and, perhaps, reduce yields. Accordingly, the overall multi-biometric sensor 145 may less expensive and may be more rugged and reliable than a sensor including four or more metal layers as would be appreciated by those skilled in the art. As will be appreciated by those skilled in the art, the construction of the electric field sensing pixels 163*a* is also fully compatible with the optical dispersion and/or infrared sensing pixels described herein.

The electric field sensing pixel 163*a* and various processing features and further advantages are disclosed, for example, in U.S. Pat. No. 5,953,441 to Setlak and assigned to the assignee of the present invention. The entire contents of this Setlak patent are incorporated herein by reference. The patent also discloses use of the electric field sensing pixel 163*a* to determine a complex impedance of the user's finger to thereby aid in reducing the likelihood of spoofing the sensor with other than a live finger. In the present multi-biometric sensor 145, the electrical field sensing pixel 163*a* could also be used in complex impedance measuring as another biometric characteristic of the user to aid in efficient matching.

Figure 23:
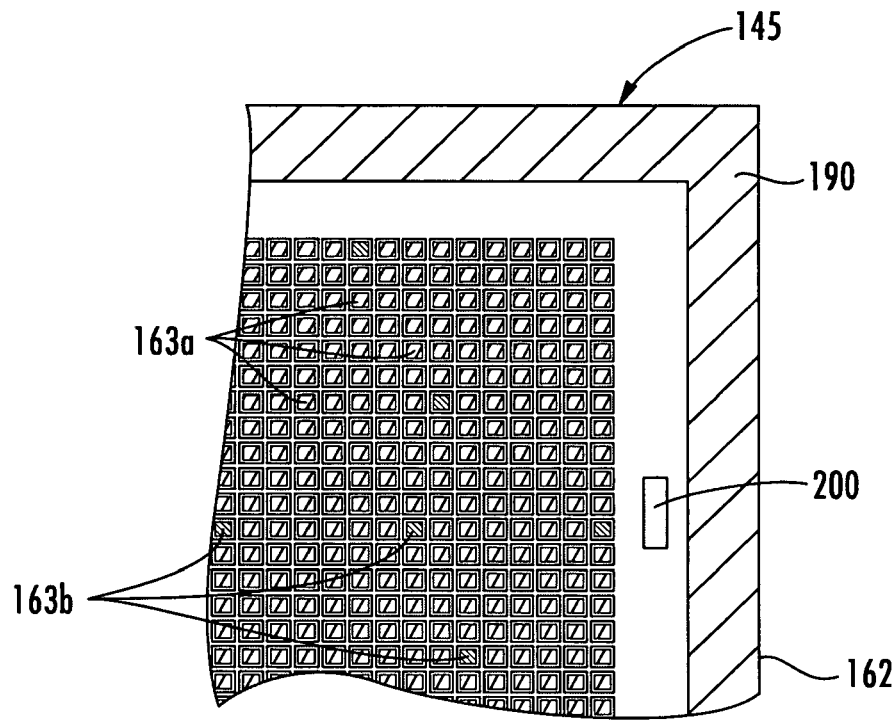
FIG. 23 is a schematic top plan view of a portion of a multi-biometric sensor embodiment including electric field sensing pixels and optical dispersion sensing pixels in accordance with the invention.

Each of the second set of biometric sensing pixels of the multi-biometric sensor 145 may comprise an optical dispersion sensing pixel 163*b* for sensing dispersed light from the user's finger, in combination with the electric field sensing pixels as shown an embodiment of FIG. 23. In this embodiment, the electric field drive ring 190 extends around the periphery, and the two pixel types are intermingled in the sensing area. The light source is provided by the surface emitting LED 200 carried by the integrated circuit substrate 162.

Figure 24:
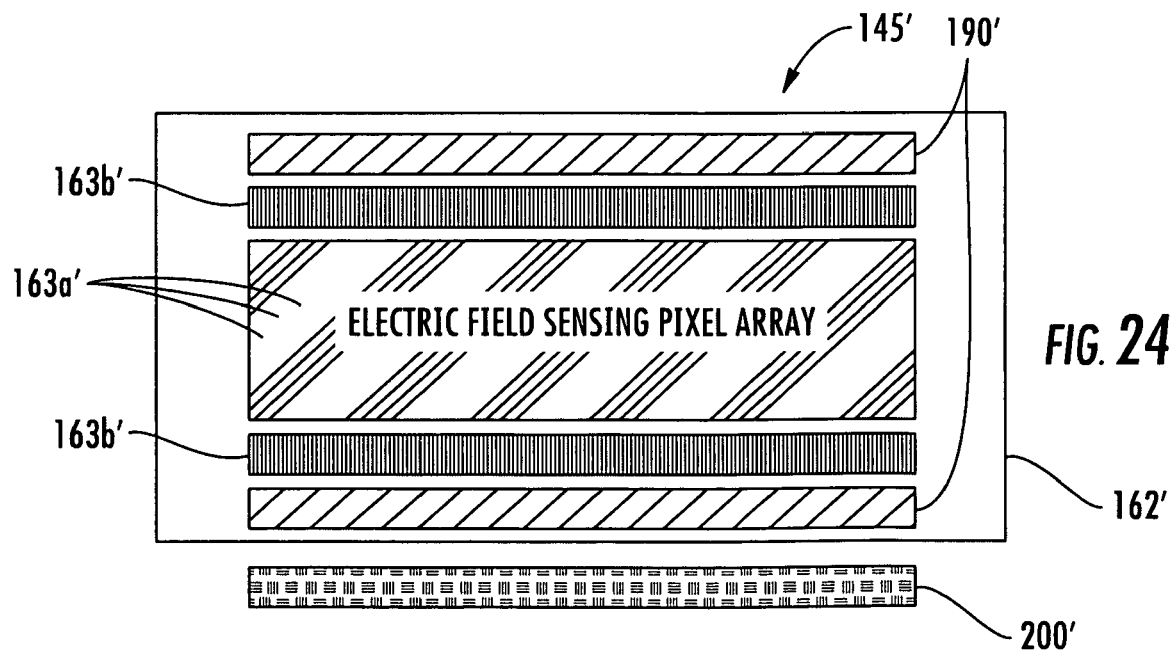
FIG. 24 is a schematic top plan view of a portion of another embodiment of a multi-biometric sensor including electric field sensing pixels and optical dispersion sensing pixels in accordance with the invention.

Another possible layout of the optical dispersion sensing pixels 163*b'* and electric field sensing pixels 163*a'* is shown in FIG. 24. In this embodiment of a multi-biometric sensor 145', the optical dispersion pixels are arranged in first and second groups flanking the array of electric field sensing pixels 163*a'*. The finger drive electrode 162' is also shown as two segments on the outside of the respective first and second groups of optical dispersion sensing pixels 163*b'*. In this embodiment, the light source 200' is provide from off the integrated circuit substrate 162'.

Figure 25:
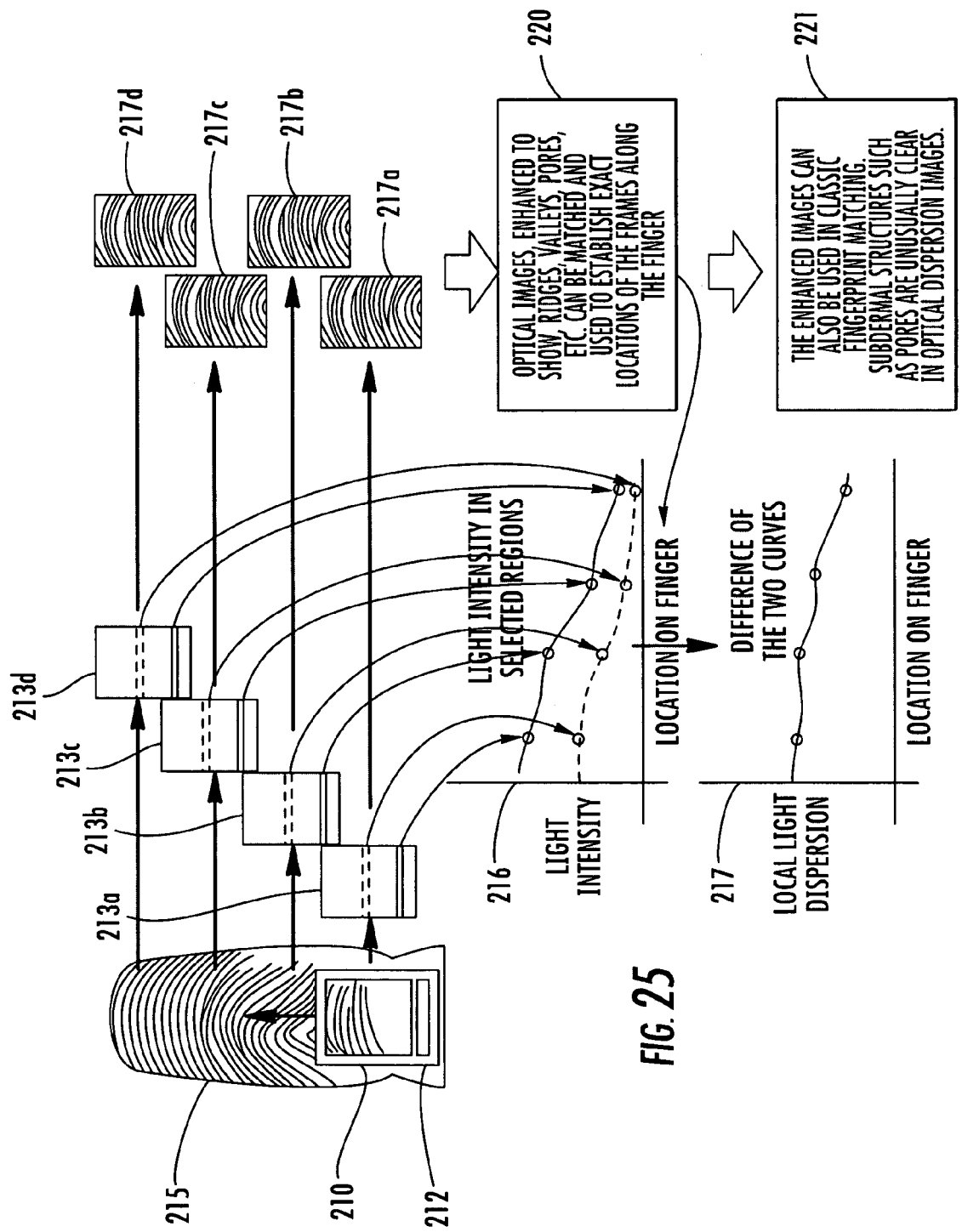
FIG. 25 is a schematic diagram of a multi-biometric sensor as may be used in the device of FIG. 19 illustrating processing of biometric data therefrom.

Turning now additionally to FIG. 25, advantageous processing of the multi-biometric data from a multi-biometric finger sensor 210 is described. The illustrated multi-biometric sensor 210 is of the slide type including electric field sensing pixels and optical dispersion pixels as described above. The optical source 212 is located on the integrated circuit substrate in the illustrated embodiment. A static placement multi-biometric sensor may produce similar data as will be appreciated by those skilled in the art.

In particular, a first sequence of relative intensity data is illustrated by the image blocks 213*a*–213*a*–213*d*. The light intensity is sequentially sensed at two spaced points in the X-direction, that is, the direction of advancement of the user's finger 215, the intensity at these two spaced positions is plotted in the upper and lower curves of the graph 216. As expected, the curve from the location closer to the optical source 212 is greater than from the other spaced location. As also shown, a difference between these two curves is determined and plotted in the graph 217. As can be seen the difference in local light dispersion seen in lower graph 217 varies with position along the finger.

Figure 26:
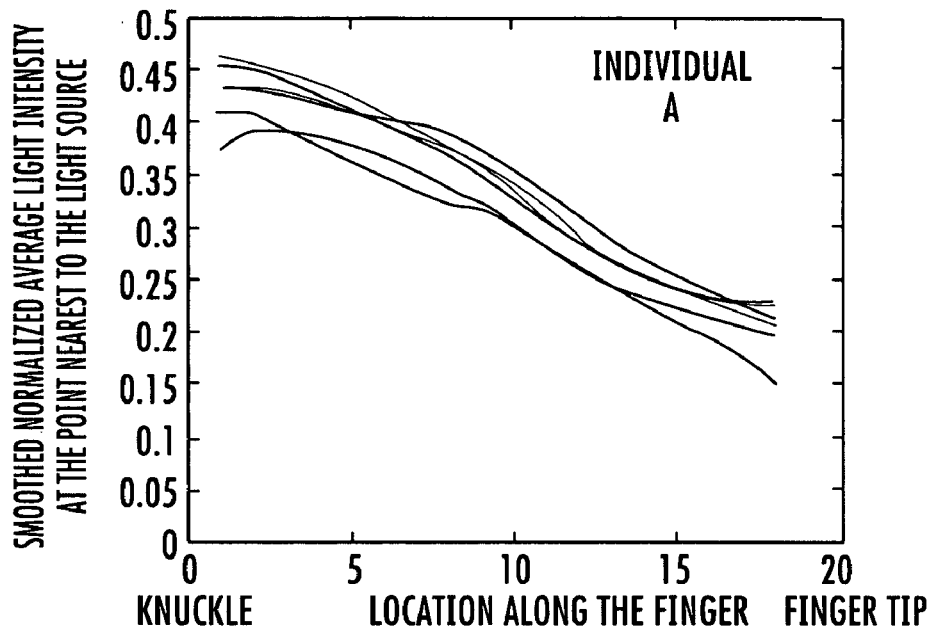
FIGS. 26–28 are graphs of collected and processed optical dispersion data from three different users as may be obtained using the biometric sensor of FIG. 19.
Figure 27:
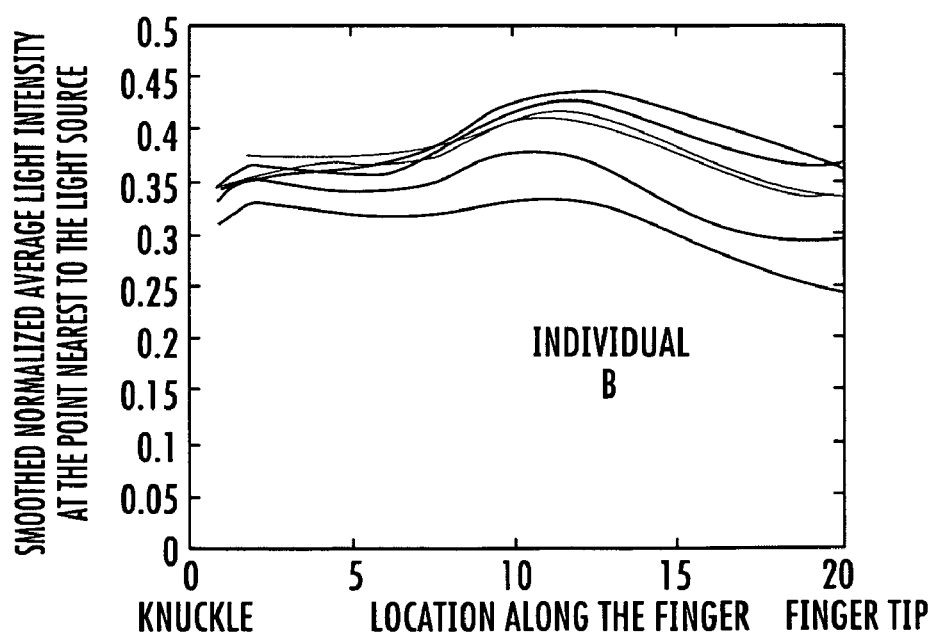
Figure 28:
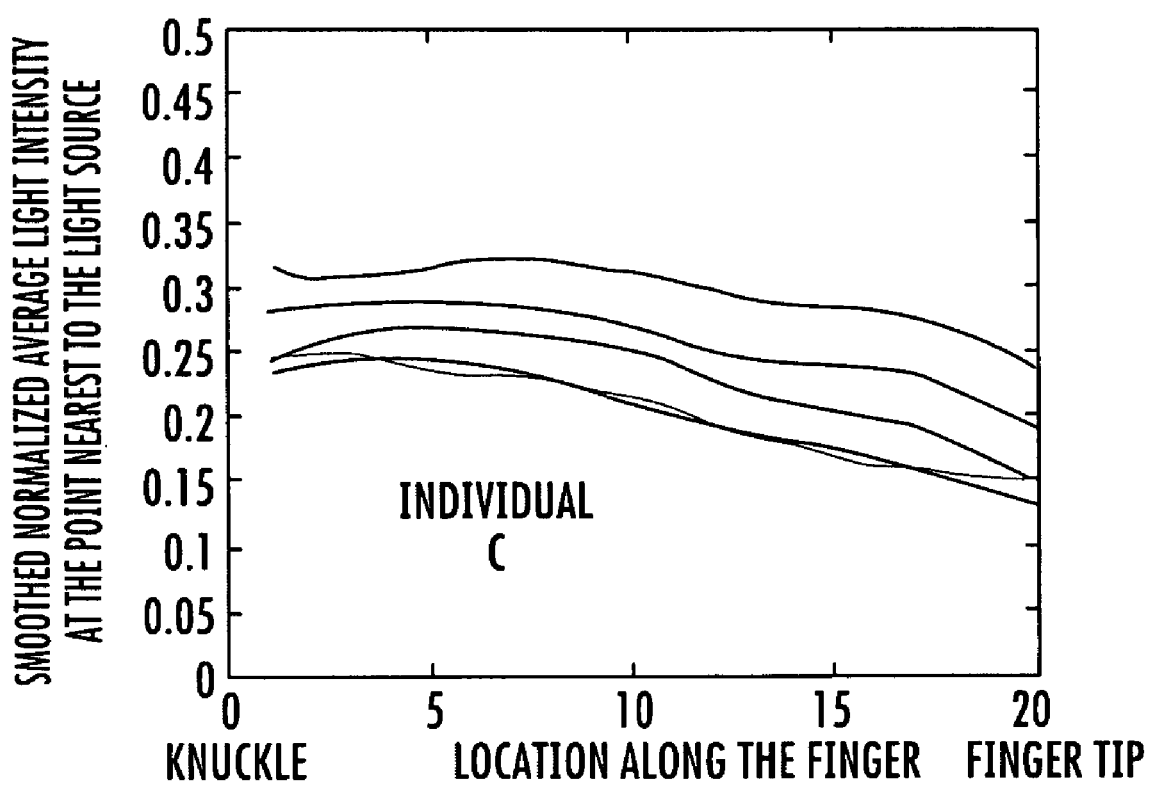

Referring now briefly to the curves of FIGS. 26, 27 and 28 for different individuals A, B and C, it can be seen that the optical dispersion data so compiled is indeed unique to the different individuals over repeated measurements. Accordingly, the optical dispersion data so processed may serve as a valuable biometric matching characteristic especially in combination with the higher selectivity provide by the fingerprint friction ridge image sensing provided by the electric field sensing pixels.

Returning now again to FIG. 25, and the right hand side thereof, a series of optical images enhanced to show ridges, valleys, pores, etc. is shown. As noted in Block 220 these enhanced images can be matched and used to establish exact locations of the frames along the finger 215. As noted at processing Block 221 the enhanced images can also be used by classical fingerprint matching. Moreover, subdermal structures, such as pores are especially clear in optical dispersion images.

Figure 29:
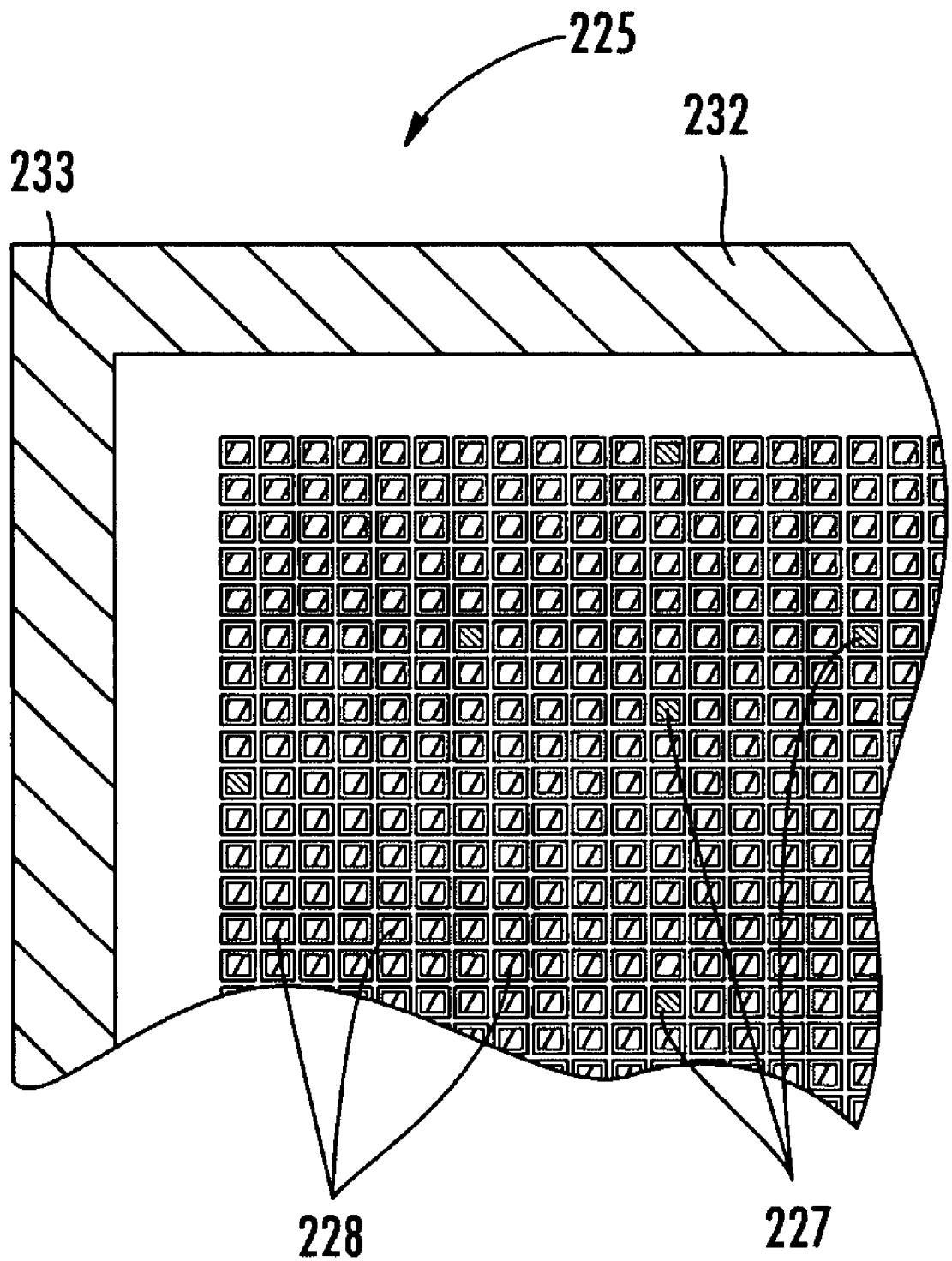
FIG. 29 is a top plan view of a portion of yet another embodiment of a multi-biometric sensor including electric field sensing pixels and infrared sensing pixels in accordance with the invention.

Referring now additionally to FIG. 29, another multi-biometric sensor 225 is now described. In this embodiment, infrared sensing pixels 227 on the integrated circuit substrate 232 provide the second set of biometric sensing pixels having the lower selectivity, while electric field sensing pixels 228 provide the sensing pixels having the higher matching selectivity. A drive electrode 233 is also illustratively positioned around the periphery of the sensor 225. Of course, exemplary embodiments of infrared sensing pixels are extensively described above and need no further description here. If the operating frequencies of the different sensing pixels 227, 228 is sufficiently different, e.g. on the order of $10^6$ Hz apart, it is likely that both types of sensing pixels can be operated simultaneously. Those of skill in the art will appreciate in that other embodiments, the selectivity of the electric field sensing pixels 228 could be less than the infrared sensing pixels 227, such as by altering the relative numbers of each, for example.

Figure 30:
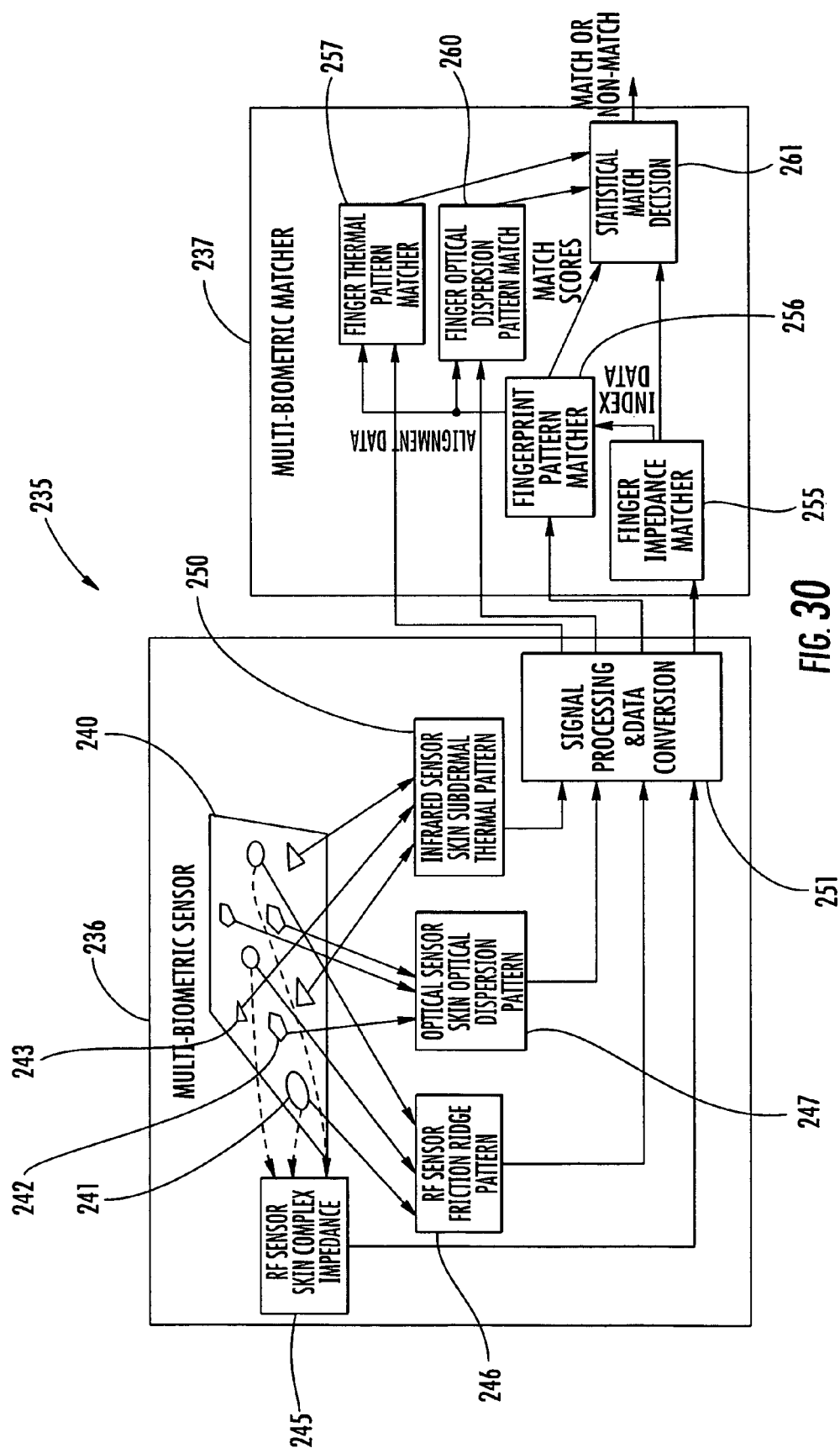
FIG. 30 is a schematic block diagram of another embodiment of a multi-biometric sensor in accordance with the present invention.

With additional reference to FIG. 30, another multi-biometric sensing and matching system 235 is now explained. In this embodiment, a number of the above-described biometric finger characteristic sensing and processing aspects are combined. The system 235 illustratively includes a multi-biometric sensor 236 coupled to a multi-biometric matcher 237. The multi-biometric sensor 236 includes an integrated circuit substrate 240 upon which electric field sensing pixels 241, optical dispersion sensing pixels 242, and infrared sensing pixels 243 are provided.

A processor executing a respective software module performs complex skin impedance measuring using the electric field sensing pixels 241 at Block 245. The electric field sensing pixels 241 are also operated to generate a friction ridge pattern by Block 246. Similarly, Block 247 produces an optical dispersion skin pattern from the optical dispersion sensing pixels 242. In addition, the infrared sensing pixels are used to generate subdermal thermal or infrared patterns by Block 250. The data produced by Blocks 245, 246, 247 and 250 is illustratively fed to Block 251 for signal processing and data conversion.

The outputs of the signal processing and data conversion Block 251 are coupled to several modules or Blocks in the multi-biometric matcher 237. In particular, the finger impedance matcher of Block 255 receives an output, as do the finger pattern matcher of Block 256, the finger optical dispersion pattern matcher of Block 260, and the thermal pattern matcher of Block 257. As explained above, it may be desirable to spatially correlate the thermal or infrared pattern data and optical dispersion data to a finger location and this is done by coupling outputs of the fingerprint pattern matcher of Block 256 to Blocks 257 and 260.

Lastly as shown in the illustrated system 235 Block 261 may be used to perform a statistical match decision. This may be done by a simple voting algorithm or by more sophisticated weighting algorithms as will be appreciated by those skilled in the art.

The types of multi-biometric sensors disclosed herein, containing a mixture of different sensor types has several advantages over both traditional single biometric sensors, and over non-integrated sets of multi-biometric measurements. Multiple biometrics methods can be satisfied simultaneously and in the same small physical space. The temporal and spatial simultaneity requirement makes spoofing more difficult. The sensors are easy and convenient use, as the user can provide a single presentation of a single body part, such as the finger, while generating multiple biometric measurements for use in high accuracy identification and identity verification, greatly simplifying and speeding up multi-biometric measurements. The sensors provide a single acquisition/signal-processing device that integrates the measurement of several different biometric characteristics, eliminating the need for multiple independent reading devices and signal processing systems, and eliminating the excessive equipment cost of prior art multi-biometric systems.

An advantage of the multi-biometric sensor embodiments disclosed herein is that they can use biometric measurements that, by themselves, have only a limited degree of selectivity between people. These low-selectivity biometrics have rarely been exploited in the past because by themselves they are not very useful. A combination of several of these biometrics, however, if they are statistically orthogonal and acquired simultaneously, can have a joint selectivity that approaches the mathematical product of the individual selectivities. Less selective biometrics can be combined with stronger biometrics, such as fingerprint verification, to yield a system with very strong selectivity that is much more difficult to spoof than the single high-selectivity biometric alone, such as the fingerprint alone.

Some of the secondary biometrics, such as finger thermal profile, generate very diffuse image characteristics. Since there are no definite edges in the images, it is difficult find the proper alignment for matching. When an image of the same area is taken simultaneously using both a strongly edged characteristics, e.g. the fingerprint, and a diffuse characteristic, e.g. the finger thermal profile, the exact alignment of the match data with the template can be established using the edged characteristic. This alignment can then be applied to the diffuse characteristic, permitting a higher confidence match assessment of that characteristic. The result is a small, inexpensive, easy to use multi-biometric sensor that has performance exceeding that of the traditional biometric systems, both in terms of match accuracy and spoof reduction.

The multi-biometric sensors described herein are envisioned as fabricated on a silicon integrated circuit substrate, with the various sensors and signal processing integrated into the silicon. The user places his finger on the device, and the system reads several different properties or biometric characteristics of the finger skin adjacent to the sensor simultaneously. Examples of the kind of biometric measurements and sensors that could be used include any of the various kinds of sensing mechanisms known to measure the physical friction ridge structure of the skin. Such sensors include optical systems, RF imaging systems, contact temperature and thermal flux systems, electrical capacitance systems, pressure measuring systems, vibration damping systems, ultrasonic systems, etc. Also possible are electronic mechanisms for detecting the bulk electrical and electromagnetic properties of the skin, such as electrical impedance sensors. In addition, sensing mechanisms for detecting the optical transmission of dispersion properties of the skin such as photo-detectors, photo-emitters, filters, gratings, coatings, etc. may be used in yet other embodiments.

Devices that measure the subdermal thermal profile of the finger such as Infrared cameras, and infrared sensor arrays could also be used. Sensors that detect properties of the blood, cardiac pulse, or other inner structures of the skin, such as pulse-oximetry detectors, deep reading optical or infrared emitters and detectors, pulse pressure sensors etc. may be used in other embodiments. In addition, sensors can be used that measure the bulk mechanical stiffness or low frequency mechanical damping properties of the skin, such as force gages or stain gages, pressure sensing elements, vibrating elements, accelerometers, etc. Other sensors that measure properties of the layered structures of the skin, such as ultrasonic transducers, may be used. Devices that measure skin surface chemistry, such as semiconductor electrolyte ion detectors, etc. may also be used in various other embodiments of the multi-biometric sensors described herein as will be appreciated by those skilled in the art.

Other related features and aspects of the sensors described herein may be found in copending patent applications entitled MULTI-BIOMETRIC FINGER SENSOR INCLUDING OPTICAL DISPERSION SENSING PIXELS AND ASSOCIATED METHODS, Ser. No. 10/935,705; FINGER SENSOR USING OPTICAL DISPERSION SENSING AND ASSOCIATED METHODS, Ser. No. 10/935,482; MULTI-BIOMETRIC FINGER SENSOR INCLUDING ELECTRIC FIELD SENSING PIXELS AND ASSOCIATED METHODS, Ser. No. 10/935,703; MULTI-BIOMETRIC FINGER SENSOR USING DIFFERENT BIOMETRICS HAVING DIFFERENT SELECTIVITIES AND ASSOCIATED METHODS, Ser. No. 10/935,704; INFRARED BIOMETRIC FINGER SENSOR INCLUDING INFRARED ANTENNAS AND ASSOCIATED METHODS, Ser. No. 10/935,484; INFRARED BIOMETRIC FINGER SENSOR AND ASSOCIATED METHODS, Ser. No. 10/935,468; ELECTRONIC DEVICE INCLUDING OPTICAL DISPERSION FINGER SENSOR AND ASSOCIATED METHODS, Ser. No. 10/935,472; and MULTI-BIOMETRIC FINGER SENSOR INCLUDING INFRARED SENSING PIXELS AND ASSOCIATED METHODS, Ser. No. 10/935,483, assigned to the assignee of the present invention and the entire subject matter of which is incorporated herein by reference. Many modifications and other embodiments of the invention will come to the mind of one skilled in the art having the benefit of the teachings presented in the foregoing descriptions and the associated drawings. Therefore, it is understood that the invention is not to be limited to the specific embodiments disclosed, and that modifications and embodiments are intended to be included within the scope of the appended claims.

What is claimed is:

1. A multi-biometric finger sensor apparatus comprising:
an integrated circuit for receiving a user's finger adjacent thereto;
at least one optical dispersion sensing pixel on said integrated circuit substrate for sensing dispersed light from the user's finger;
at least one other finger biometric characteristic sensor on said integrated circuit substrate for sensing a finger biometric characteristic different than the dispersed light from the user's finger; and
a processor connected to said at least one optical dispersion sensing pixel and said at least one other finger biometric characteristic sensor.

2. A multi-biometric finger sensor apparatus according to claim 1 further comprising an optical source for directing light into a user's finger when positioned adjacent said integrated circuit substrate, the light propagating into and being dispersed by the user's finger so that at least a portion of the dispersed light exits the user's finger in a direction toward said integrated circuit substrate.

3. A multi-biometric finger sensor apparatus according to claim 1 wherein said at least one other finger biometric characteristic sensor comprises a plurality of infrared sensing pixels.

4. A multi-biometric finger sensor apparatus according to claim 1 wherein said at least one other finger biometric characteristic sensor comprises a plurality of electric field sensing pixels.

5. A multi-biometric finger sensor apparatus according to claim 1 wherein said processor comprises a matcher connected to said at least one optical dispersion sensing pixel and said at least one other biometric sensor.

6. A multi-biometric finger sensor apparatus according to claim 1 wherein said at least one optical dispersion sensing pixel and said at least one other finger biometric sensor operate based upon static placement of the user's finger adjacent said integrated circuit substrate.

7. A multi-biometric finger sensor apparatus according to claim 1 wherein said at least one optical dispersion sensing pixel and said at least one other finger biometric sensor operate based upon sliding placement of the user's finger adjacent said integrated circuit substrate.

8. A multi-biometric finger sensor apparatus according to claim 1 further comprising an uppermost dielectric passivation layer over said plurality of optical dispersion sensing pixels and said at least one other biometric sensor and upon which the user's finger is positioned.

9. A multi-biometric finger sensor apparatus according to claim 1 wherein said integrated circuit substrate comprises single crystal silicon.

10. A multi-biometric finger sensor comprising:
    an integrated circuit for receiving a user's finger adjacent thereto;
    at least one optical dispersion sensing pixel on said integrated circuit substrate for sensing dispersed light from the user's finger; and
    at least one other finger biometric characteristic sensor on said integrated circuit substrate for sensing a finger biometric characteristic different than the dispersed light from the user's finger.

11. A multi-biometric finger sensor according to claim 10 further comprising an optical source on said integrated circuit substrate for directing light into a user's finger when positioned adjacent said integrated circuit substrate, the light propagating into and being dispersed by the user's finger so that at least a portion of the dispersed light exits the user's finger in a direction toward said integrated circuit substrate.

12. A multi-biometric finger sensor according to claim 10 wherein said at least one other finger biometric characteristic sensor comprises a plurality of infrared sensing pixels.

13. A multi-biometric finger sensor according to claim 10 wherein said at least one other finger biometric characteristic sensor comprises a plurality of electric field sensing pixels.

14. A multi-biometric finger sensor according to claim 10 wherein said at least one optical dispersion sensing pixel and said at least one other finger biometric sensor operate based upon static placement of the user's finger adjacent said integrated circuit substrate.

15. A multi-biometric finger sensor according to claim 10 wherein said at least one optical dispersion sensing pixel and said at least one other finger biometric sensor operate based upon sliding placement of the user's finger adjacent said integrated circuit substrate.

16. A multi-biometric finger sensor according to claim 10 further comprising an uppermost dielectric passivation layer over said plurality of optical dispersion sensing pixels and said at least one other biometric sensor and upon which the user's finger is positioned.

17. A multi-biometric finger sensor according to claim 10 wherein said integrated circuit substrate comprises single crystal silicon.

18. A method according to claim 17 wherein the at least one optical dispersion sensing pixel and the at least one other finger biometric sensor operate based upon static placement of the user's finger adjacent the integrated circuit substrate.

19. A method according to claim 17 wherein the at least one optical dispersion sensing pixel and the at least one other finger biometric sensor operate based upon sliding placement of the user's finger adjacent the integrated circuit substrate.

20. A method according to claim 17 further comprising an uppermost dielectric passivation layer over the at least one optical dispersion sensing pixel and the at least one other biometric sensor and upon which the user's finger is positioned.

21. A method for multi-biometric finger sensing comprising:
    receiving a user's finger adjacent an integrated circuit substrate;
    sensing dispersed light from the user's finger by using at least one optical dispersion sensing pixel on the integrated circuit substrate; and
    sensing a finger biometric characteristic different than the dispersed light from the user's finger by using at least one other finger biometric characteristic sensor on the integrated circuit substrate.

22. A method according to claim 21 further comprising an optical source for directing light into a user's finger when positioned adjacent the integrated circuit substrate, the light propagating into and being dispersed by the user's finger so that at least a portion of the dispersed light exits the user's finger in a direction toward the plurality of optical dispersion sensing pixels.

23. A method according to claim 21 wherein the at least one other finger biometric characteristic sensor comprises a plurality of infrared sensing pixels.

24. A method according to claim 21 wherein the at least one other finger biometric characteristic sensor comprises a plurality of electric field finger sensing pixels.

25. A method according to claim 21 further comprising using a matcher connected to the at least one optical dispersion sensing pixel and the at least one other biometric sensor.

* * * * *

UNITED STATES PATENT AND TRADEMARK OFFICE
CERTIFICATE OF CORRECTION

PATENT NO. : 7,214,953 B2
APPLICATION NO. : 10/935705
DATED : May 8, 2007
INVENTOR(S) : Setlak et al.

It is certified that error appears in the above-identified patent and that said Letters Patent is hereby corrected as shown below:

| | |
|---|---|
| Column 12, Line 8 | Delete: " develop clean"<br>Insert: -- develop a clean -- |
| Column 12, Line 48 | Delete: " 195 "<br>Insert: -- 192 -- |
| Column 13, Line 35 | Delete: "provide"<br>Insert: -- provided -- |
| Column 13, Line 48 | Delete: "213a -213a - 213d"<br>Insert: -- 213a - 213d -- |
| Column 13, Line 65 | Delete: "provide"<br>Insert: -- provided -- |
| Column 15, Line 5 | Delete: " use "<br>Insert: -- to use -- |
| Column 16, Line 8 | Delete: " stain "<br>Insert: -- strain -- |

Signed and Sealed this

Fourteenth Day of August, 2007

JON W. DUDAS
*Director of the United States Patent and Trademark Office*